(12) United States Patent
Allen (10) Patent No.: US 7,943,705 B2
(45) Date of Patent: May 17, 2011

(54) CREPING ADHESIVES MADE FROM AMINE-TERMINATED POLYAMIDOAMINES

(75) Inventor: Anthony J. Allen, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 506 days.

(21) Appl. No.: 12/016,494

(22) Filed: Jan. 18, 2008

(65) Prior Publication Data

US 2008/0255320 A1 Oct. 16, 2008

Related U.S. Application Data

(60) Provisional application No. 60/881,315, filed on Jan. 19, 2007.

(51) Int. Cl.
*C08L 77/00* (2006.01)
*D21H 21/20* (2006.01)

(52) U.S. Cl. .............. 525/430; 162/164.3; 525/420

(58) Field of Classification Search .............. 525/420, 525/430; 162/164.3
See application file for complete search history.

(56) References Cited

U.S. PATENT DOCUMENTS

| | | | |
|---|---|---|---|
| 2,926,116 | A | 2/1960 | Keim |
| 4,689,374 | A | 8/1987 | Hansson et al. |
| 6,554,961 | B1 | 4/2003 | Riehle et al. |
| 7,081,512 | B2 | 7/2006 | Riehle |
| 2004/0198947 | A1 | 10/2004 | Maslanka |
| 2007/0056706 | A1 | 3/2007 | Crisp et al. |

FOREIGN PATENT DOCUMENTS

| | | |
|---|---|---|
| DE | 34 21 557 | 1/1985 |
| WO | WO-97/11223 | 3/1997 |
| WO | WO-00/77076 | 12/2000 |
| WO | WO-2004/092248 | 10/2004 |
| WO | WO-2004/106410 | 12/2004 |
| WO | WO-2007/008945 | 1/2007 |

*Primary Examiner* — Ana L Woodward
(74) *Attorney, Agent, or Firm* — Joanne Mary Fobare Rossi (57) ABSTRACT

Polyamidoamine (PAE) resins are prepared from polyamidoamine made with excess amine, which are reacted with a specifically defined amount of difunctional crosslinker. The amount of difunctional crosslinker used is based on the polyamidoamine amine number and reduced specific viscosity (RSV). The PAE resin is prepared by first synthesizing a polyamidoamine from a polyamine and a polycarboxylic acid or polycarboxylic acid derivative, wherein the polyamine is present in a molar excess, said molar excess being from about 1.02 to 2.00, then reacting the polyamidoamine with difunctional crosslinker, wherein the weight % of difunctional crosslinker to polyamidoamine solids is no more than about 0.308(amine number/RSV)—9.18 or 385(amine number/RSV)—5.20, wherein the amine number is expressed as the milliequivalents of amine per gram of polyamidoamine solids and the RSV is the reduced specific viscosity measured at 2% concentration in 1M $NH_4Cl$ expressed in deciliters per gram. PAE resins prepared according to this process can by used in creping adhesives, which are used to manufacture a variety of paper articles, such as facial tissue, bath tissue, wipes, paper towels, paper napkins, filter papers, and coffee filters.

12 Claims, 1 Drawing Sheet

Figure 1. Maximum Epi/Amine Ratio as a Function of Amine #/RSV

Figure 2. Maximum Wt. % Epi/Polymer Ratio as a Function of Amine #/RSV

US 7,943,705 B2

CREPING ADHESIVES MADE FROM AMINE-TERMINATED POLYAMIDOAMINES

RELATED APPLICATIONS

This application claims benefit to U.S. Provisional Application Ser. No. 60/881,315, filed Jan. 19, 2007, which is incorporated herein by reference in its entirety for all useful purposes.

BACKGROUND OF THE INVENTION

Polyamidoamine resins (PAE resins) have been used as additives in the manufacture of paper having high levels of wet strength. See e.g., U.S. Pat. Nos. 2,926,116 and 2,926,154. PAE resins have also been used as adhesives in the creping process for producing tissue and towel paper products. See e.g., U.S. Pat. No. 5,338,807 and Canadian Patent No. 979,579. Numerous other polymers and combinations of polymers have been used as adhesives in the process of creping tissue and towel grades of paper.

Cationic polyamidoamines crosslinked with a multi-functional aldehyde have been disclosed, See e.g., U.S. Pat. No. 5,382,323. Creping adhesives based on an admixture of PAE resins have also been disclosed, as have highly branched PAE resins having high molecular weight and procedures for making them. See e.g., U.S. Pat. Nos. 5,382,323; 5,786,429; and 5,902,862.

PAE resins are typically made by a two-step process. In the first step a polyamidoamine is synthesized by the polycondensation of near-equimolar quantities of a diacid and a polyamine (e.g., adipic acid and diethylenetriamine (DETA)). In the second step, the polyamidoamine is reacted with a difunctional crosslinker, such as epichlorohydrin, in aqueous solution. When producing wet strength resins the ratio of epichlorohydrin to the amine groups of the polyamidoamine is close to equimolar. Creping adhesives are generally made with an epichlorohydrin/amine ratio of less than 1.00, and typically in a ratio in the range of from 0.05 to 0.50.

Preparation of PAE Wet Strength Resins Made from Polyamidoamines that were Prepared with an excess of polyalkylenepolyamine have also been described. See e.g., U.S. Pat. Nos. 4,287,110; 4,336,835; and 5,017,642. High solids PAE wet strength resins made from polyamidoamines that were prepared with an excess of polyalkylenepolyamine has also been disclosed. See e.g., U.S. Pat. No. 6,908,983, which also discloses PAE creping adhesives made from polyamidoamines prepared with an amine excess.

Although a wide range of chemistry has been developed for creping applications, there still exists a need for improved adhesive products to be used in the creping process and improved processes for making such products. In particular, adhesives that will provide good creping performance under conditions of high temperature and/or low sheet moisture are quite desirable. Surprisingly, it has been found that creping adhesives prepared according to the processes of the present invention provide superior high temperature performance when compared to other creping adhesives.

EMBODIMENTS OF THE INVENTION

One embodiment of the present invention is a process for preparing a polyamidoamine resin comprising (1) reacting a polycarboxylic acid or a polycarboxylic acid derivative with an excess of a polyamine to form a polyamidoamine, and (2) reacting the polyamidoamine of (1) with a difunctional crosslinker to form a polyamidoamine resin, wherein the molar ratio of said polyamine to said polycarboxylic acid is in the range of from 1.02:1 to 2.0:1, and the weight ratio of said difunctional crosslinker to the solids of said polyamidoamine is no greater than about 0.308(amine number/RSV)—9.18 or 0.385(amine number/RSV)—5.20, wherein said amine number is expressed as the milliequivalents of amine per gram of polyamidoamine solids and said RSV is the reduced specific viscosity measured at 2% concentration in 1 M $NH_4Cl$ expressed in deciliters per gram.

Another embodiment of the present invention is the above process, wherein (2) is conducted in aqueous media.

Another embodiment of the present invention is the above process, wherein said difunctional crosslinker is epichlorohydrin.

Another embodiment of the present invention is the above process, wherein said polycarboxylic acid is selected from the group consisting of malonic acid, glutaric acid, adipic acid, azelaic acid, citric acid, tricarballylic acid (1,2,3-propanetricarboxylic acid), 1,2,3,4-butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, phlthalic acid, isophthalic acid, terephthalic acid, 1,2,4-benzenetricarboxylic acid (trimellitic acid) and 1,2,4,5-benzenetetracarboxylic acid (pyromellitic acid), and mixtures thereof.

Another embodiment of the present invention is the above process, wherein said polycarboxylic acid derivative is selected from the group consisting of dimethyl adipate, dimethyl malonate, diethyl malonate, dimethyl succinate, dimethyl glutarate, diethyl glutarate, succinic anhydride, maleic anhydride, N,N,N',N'-ethylenediaminetetraacetate dianhydride, phthalic anhydride, mellitic anhydride, pyromellitic anhydride, adipoyl chloride, glutaryl chloride, sebacoyl chloride, and mixtures thereof.

Another embodiment of the present invention is the above process, wherein said polyamine is selected from the group consisting of polyethylene polyamines, polypropylene polyamines, polybutylene polyamines, polypentylene polyamines, polyhexylene polyamines, and mixtures thereof.

Another embodiment of the present invention is the above process, wherein said polyamine is selected from the group consisting of diethylenetriamine (DETA), triethylenetetramine (TETA), tetraethylenepentamine (TEPA), dipropylenetriamine (DPTA), bis-hexamethylenetriamine (BHMT), N-methylbis(aminopropyl)amine (MBAPA), aminoethylpiperazine (AEP), and mixtures thereof.

Another embodiment of the present invention is the above process, wherein the weight ratio of said epichlorohydrin to the solids of said polyamidoamine is about 60 to 100% of 0.308 (amine number/RSV)—9.18 or 0.385(amine number/RSV)—5.20.

Another embodiment of the present invention is the above process, wherein said polycarboxylic acid derivative is adipic acid or dimethyl glutarate and said polyamine is diethylenetriamine (DETA).

Another embodiment of the present invention is the above process, wherein the molar ratio of said polyamine to said polycarboxylic acid or polycarboxylic acid derivative is in the range of from 1.02:1 to 1.48:1.

Yet another embodiment of the present invention is a polyamidoamine-epichlorohydrin resin prepared by the above process.

Yet another embodiment of the present invention is a creping adhesive comprising a polyamidoamine-epichlorohydrin resin prepared by the above process.

Yet another embodiment of the present invention is an article comprising a creping adhesive comprising a polyamidoamine-epichlorohydrin resin prepared by the above process, wherein said article is selected from the group consisting of facial tissue, bath tissue, wipes, paper towels, paper napkins, filter papers, and coffee filters.

Yet another embodiment of the present invention is an article comprising a polyamidoamine-epichlorohydrin resin prepared by the above process, wherein said article is selected from the group consisting of facial tissue, bath tissue, wipes, paper towels, paper napkins, filter papers, and coffee filters.

BRIEF DESCRIPTION OF THE SEVERAL VIEWS OF THE DRAWING

The foregoing embodiments, as well as the following detailed description of the invention, may be better understood when read in conjunction with the appended drawings.

In the drawings.

DESCRIPTION OF THE INVENTION

As used herein, the singular terms "a" and "the" are synonymous and used interchangeably with "one or more" and "at least one," unless the language and/or context clearly indicate otherwise. Accordingly, for example, reference to "a polyamine" herein or in the appended claims can refer to a single polyamine or more than one polyamine.

The present invention is generally directed to processes for preparing polyamidoamine (PAE) resins, PAE resins prepared according to the processes of the present invention, creping adhesives comprising PAE resins prepared according to the processes of the present invention, and articles comprising such creping adhesives and PAE resins. One aspect of the present invention are processes for preparing a PAE resin comprises (1) reacting a polycarboxylic acid or a polycarboxylic acid derivative with an excess of a polyamine to form a polyamidoamine, and (2) reacting the polyamidoamine of (1) with a difunctional crosslinker such as epichlorohydrin, to form a polyamidoamine resin, wherein the molar ratio of the polyamine to the polycarboxylic acid is in the range of from 1.02:1 to 2.0:1, and the weight ratio of the difunctional crosslinker to the solids of the polyamidoamine is no greater than about [0.308 (amine number/RSV)—9.18] or [0.385 (amine number/RSV)—5.20], wherein the amine number is expressed as the milliequivalents of amine per gram of polyamidoamine solids and the RSV is the reduced specific viscosity measured at 2% concentration in 1M $NH_4Cl$ expressed in deciliters per gram.

PAE resins prepared by the process of the present invention provide superior creping adhesive performance. High adhesion values are obtained and the adhesion values are maintained under conditions of high temperature. In addition, the adhesion does not vary significantly as the temperature increases.

Use of excess polyamine in the processes of the present invention results in a polyamidoamine having amine end-groups almost exclusively. The polyamine excess can range from about a 1.02:1. molar ratio to about a 2.0:1. molar ratio, preferably in from about a 1.02:1 molar ratio to about a 1.48:1 molar ratio. The amine excess refers to the ratio of the total number of amine groups to the total number of carboxylic acid or carboxylic acid derivative groups present in the reaction mixture. Changing the stoichiometry of the reagents in favor of excess polyamine results in polyamidoamines having lower molecular weights than one would obtain by reacting an equimolar mixture under the same conditions.

The excess amount of amine employed in the processes of the present invention provides a means of controlling the molecular weight of the resulting polyamidoamine polymer and will also control its amine content. The $DP_n$ is defined as the number-average degree of polymerization or the average number of monomer units in a polymer chain. Equation 1 defines the $DP_n$ in terms of the molar ratios of the components, assuming complete reaction of all functional groups:

$$DP_n = (1+r)/(1-r) \qquad \text{Equation (1)}$$

where r is defined as the ratio of the monomer units and is calculated as follows:

$$r = A/B \qquad \text{Equation (2)}$$

The ratio of monomer units A and B (r) will always be less than one. In the case of the present invention, A refers to the carboxylic acid functional groups and B refers to the amine functional groups which are present in excess.

The polyamidoamines prepared by the processes of the present invention have a range of $DP_n$ of from about 3 to 100, more preferably a range of from about 3 to 50, and most preferably a range of from about 3 to 30.

The polyamidoamines prepared according to the process of the present invention are typically prepared by heating a polycarboxylic acid or a polycarboxylic acid derivative with a polyamine at a temperature of 125-200° C. for 1 to 10 hours while collecting the water of condensation produced in the reaction, at atmospheric pressure. The reaction is usually allowed to proceed until the theoretical amount of water distillate is collected from the reaction. Where a reduced pressure is employed, lower temperatures such as 75° C. to 150° C. may be utilized. At the end of this reaction, the resulting product is dissolved in water at a concentration of about 20 to 80% by weight total polymer solids, more typically at a concentration of about 30 to 70%, and most typically at a concentration of about 40 to 60%.

Any polycarboxylic acid and/or derivatives thereof may be used to prepare polyamidoamines according to the processes of the present invention. Typically, dicarboxylic acids and/or derivatives thereof are used for the preparation of polyamidoamines, although polycarboxylic acids and/or derivatives thereof having more than two carboxylate groups may be used. Suitable polycarboxylic acids include but are not limited to malonic acid, glutaric acid, adipic acid, azelaic acid, citric acid, tricarballylic acid (1,2,3-propanetricarboxylic acid), 1,2,3,4-butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, phthalic acid, isophthalic acid, terephthalic acid, 1,2,4-benzenetricarboxylic acid (trimellitic acid), 1,2,4,5-benzenetetracarboxylic acid (pyromellitic acid), and mixtures thereof.

Suitable polycarboxylic acid derivatives which may also be used to prepare polyamidoamines according to processes of the present invention include, but are not limited to, carboxylate esters, acid halides, and acid anhydrides. These derivatives are typically more reactive towards amines than the corresponding carboxylic acid, so the reaction conditions to make polyamidoamines using carboxylic acid derivatives are generally milder than the conditions used to prepare polyamidoamines from polycarboxylic acids and polyamines.

When the diester is used to prepare polyamidoamines according to processes of the present invention, the polymerization can be conducted at a lower temperature, preferably about 100-175° C. at atmospheric pressure. In this case the byproduct can be an alcohol, the type of alcohol depending upon the identity of the diester. For instance, where a dimethyl ester is employed the alcohol byproduct will be methanol, while ethanol will be the byproduct obtained from a diethyl ester. Where a reduced pressure is employed, lower temperatures such as 75° C. to 150° C. may be utilized.

Any esters may be used to prepare polyamidoamines according to the processes of the present invention. When esters of polycarboxylic acids are employed to prepare polyamidoamines according to the processes of the present invention, methyl or ethyl esters are typically used. Suitable esters of polycarboxylic acids include, but are not limited to, dimethyl adipate, dimethyl malonate, diethyl malonate, dimethyl succinate, dimethyl glutarate and diethyl glutarate. In this case the alcohol byproduct (methyl alcohol or ethyl alcohol) is distilled off in the synthesis and the synthesis can be performed at a lower temperature than when the corresponding carboxylic acid is used. A strongly basic catalyst such as sodium methoxide can be employed in the synthesis of the polyamidoamides from polycarboxylic esters and polyamines.

Any acid anhydrides may be used to prepare polyamidoamines according to the processes of the present invention. Suitable acid anhydrides that may be used to prepare polyamidoamines according to the process of the present invention include, but are not limited to, succinic anhydride, maleic anhydride, N,N,N',N'-ethylenediaminetetraacetate dianhydride, phthalic anhydride, mellitic anhydride, pyromellitic anhydride, and mixtures thereof.

Any acid halides may be used to prepare polyamidoamines according to the processes of the present invention. Suitable acid halides that may be used to prepare polyamidoamines according to the process of the present invention include, but are not limited to, polycarboxylic acid chlorides. In this case, the reaction with polyamines can be performed at very low temperatures. Appropriate polycarboxylic acid chlorides can be prepared by reacting the respective polycarboxylic acids with thionyl chloride or phosphorus trichloride. Examples include, but are not limited to, adipoyl chloride, glutaryl chloride, sebacoyl chloride, and mixtures thereof.

A single polycarboxylic acid or derivative thereof may be used to prepare polyamidoamines according to processes of the present invention, as well as mixtures of polycarboxylic acids. In addition, mixtures of polycarboxylic acids and derivatives of polycarboxylic acids are also suitable for use in the processes of the present invention.

Any polyamines may be used to prepare polyamidoamines according to the processes of the present invention. Suitable polyamines include the general class of polyalkylenepolyamines which includes polyethylene polyamines, polypropylene polyamines, polybutylene polyamines, polypentylene polyamines, polyhexylene polyamines, and mixtures thereof. Polyalkylenepolyamines which may be used in the processes of the present invention may be represented as polyamines in which the nitrogen atoms are linked together by groups of formula —$C_nH_{2n}$—where n is a small integer greater than unity and the number of such groups in the molecule ranges from two up to about eight. The nitrogen atoms may be attached to adjacent carbon atoms in the group —$C_nH_{2n}$— or to carbon atoms further apart, but not to the same carbon atom.

Suitable polyamines which may be used in the processes of the present invention include, but are not limited to diethylenetriamine, triethylenetetramine, tetraethylenepentamine, and dipropylenetriamine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a satisfactory starting material. The term "polyalkylenepolyamine" as used herein includes any of the polyalkylenepolyamines referred to above or to a mixture of such polyalkylenepolyamines and derivatives thereof.

Additional polyamines suitable for preparing polyamidoamines according to the process of the present invention include, but are not limited to, bis-hexamethylenetriamine (BHMT), N-methylbis(aminopropyl)amine (MBAPA), aminoethyl-piperazine (AEP), and other polyalkylenepolyamines (e.g., spermine, spermidine). Use of the polyamines diethylenetriamine (DETA), triethylenetetramine (TETA), tetraethylenepentamine (TEPA), and dipropylenetriamine (DPTA) are preferred.

Diamines can also be used to prepare polyamidoamines according to the process of the present invention. Diamines will not contribute to amine functionality unless only one of the amine groups reacts, leaving the other as an endgroup. When a diamine is used in place of a portion of the polyamine the overall amine functionality of the polyamidoamine is reduced (i.e., amine equivalence weight is increased). This can be accomplished by substituting a diamine such as ethylenediamine, propylenediamine, hexamethylenediamine and the like for a portion of the polyalkylene polyamine. For this purpose, up to about 80% of polyalkylene polyamine may be replaced by molecularly equivalent amount of the diamine in the processes of the present invention. Usually, a replacement of about 50% or less of polyalkylene polyamine with diamine is sufficient.

Similar to adding a diamine in a polyamidoamine synthesis, aminocarboxylic acids or lactams increase the spacing between amine functional groups without contributing any amine functionality to the polymer, other than as endgroups. Appropriate aminocarboxylic acids containing at least three carbon atoms or lactams thereof are also suitable for use in the processes of the present invention to increase spacing. For example, 6-aminohexanoic acid and caprolactam are suitable additives for this purpose.

Any difunctional crosslinker can be used to prepare PAE resins according to the processes of the present invention. Suitable difunctional crosslinkers include epihalohydrins, i.e., epichlorohydrin, epifluorohydrin, epibromohydrin, and epiiodohydrin as well as alkyl-substituted epihalohydrins. Other suitable difunctional crosslinkers include 1-bromo-3,4-epoxybutane, chloroepoxyhexane and iodoepoxyisobutane. Diepoxides such as ethylene glycol diglycidyl ether (EGDGE) and 1,4-butanediol diglycidyl ether (BDDGE) are also included herein as useful crosslinkers. Other suitable diepoxide crosslinkers include 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether.

Further suitable difunctional crosslinkers include diacrylates, dimethyacrylates, diacrylamides, and dimethacrylamides, which are reactive with the amine groups of the polyamidoamine by a Michael addition reaction. Examples of such crosslinkers include ethylene glycol diacrylate, ethylene glycol dimetharcrylate, 1,4-butanediol diarcrylate, 1,4-butanediol dimethacrylate, tripropylene glycol diacrylate, tripropylene glycol dimethacrylate, triethylene glycol diacrylate, triethylene glycol dimethacrylate, 1,6-hexanediol diacrylate, 1,6-hexanediol dimethacrylate, N,N'-methylenebisacrylamide, N,N'-methylenebis-methacrylamide, N,N'-(1,2-dihydroxyethylene)bisacrylamide, and N,N'-(1,2-dihydroxyethylene)bismethacrylamide.

Use of epichlorohydrin as a difunctional crosslinker for preparing PAE resins according to the processes of present invention is preferred.

The synthesis of a PAE resin from the amine-excess polyamidoamine is achieved by reacting the polyamidoamine with a difunctional crosslinker, such as epichlorohydrin, preferably in aqueous media. Reaction of the polyamidoamine with epichlorohydrin will result in an increase in molecular weight and will impart reactive functionality to the polyamidoamine in the form of aminochlorohydrin and azetidinium functional groups.

The reaction of the polyamidoamine with epichlorohydrin in aqueous solution is conducted at a total solids concentration of from 10 to 75%, more preferably from 15 to 40%, and most preferably from 20 to 35%. The temperature may be from 15 to 95° C., more preferably from 30 to 80° C., and most preferably from 40 to 70° C.

This reaction may be conducted in a single step or may be performed in a series of steps. For a single step process the polyamidoamine, dilution water, and epichlorohydrin are added to the reaction vessel and the mixture is heated to the desired reaction temperature while monitoring the viscosity build. The viscosity build is typically monitored using BYK-Gardner bubble viscosity tubes, available from BYK-Gardner USA, Columbia, Md. The viscosity monitoring is performed by removing a sample of the reaction mixture, cooling it to 25° C., placing it in a standard BYK-Gardner viscosity tube and comparing the rate of bubble rise in the reaction sample to standard BYK-Gardner bubble viscosity tubes held at 25° C. When the viscosity reaches the appropriate Gardner tube value, heating is discontinued and dilution water may optionally be added to the reaction mixture to adjust the solids content. The BYK-Gardner viscosity at the endpoint is usually in the range of D to T, more preferably in the range of G to Q, and most preferably in the range of I to O.

For multiple step processes, the same procedure as the single step process is applied, except that when the viscosity endpoint is reached dilution water is added while maintaining heating of the reaction mixture and the reaction is allowed to continue at the lower solids content. The reaction then proceeds until the viscosity end point is reached. This procedure can be repeated any number of times until the desired end viscosity at a given solids content is achieved. A typical multi-step reaction process could have a first cook at 20 to 50% solids content, a second cook at 15 to 45% solids content, and a third cook at 10 to 40% solids content. The viscosity endpoints and reaction temperatures at the different steps can be varied. Often it is desirable to use a lower temperature for the initial cook steps and to increase the temperature as the reaction is diluted to help drive the reaction to completion.

Stabilization with an acid may optionally be performed at the reaction endpoint. Suitable acids for stabilization include, but are not limited to, mineral acids such as sulfuric acid, phosphoric acid, phosphorous acid, hypophosphorous acid, nitric acid, nitrous acid, hydrochloric acid, hydrobromic acid, and hydroiodic acid. Suitable organic carboxylic acids include, but are not limited to, formic acid, acetic acid, propionic acid, butyric acid, or benzoic acid may also be used. Sulfonic acids, including methanesulfonic acid or toluenesulfonic acid are also suitable for stabilizing the product. A single acid may be used for stabilization or a mixture of different acids may be used for the stabilization. When stabilizing with an acid, the pH is adjusted to a value of 2.0 to 7.0, more preferably from 2.5 to 6.0, and most preferably from 3.0 to 5.0.

It is not always necessary to stabilize the product to an acidic pH, and in some cases it is preferred to keep the product at its unadjusted, alkaline pH.

The PAE resin product can have a total solids content of from about 5% to 60%, more preferably from about 10% to 40%, and most preferably from about 15% to about 30%.

In the synthesis of a PAE resin creping adhesive, it is desirable to maximize the molecular weight of the resin while avoiding gelation of the reaction mixture. This can often be a difficult process to control. It is also advantageous and beneficial for the resin to exhibit good shelf life properties, i.e., to maintain its fluidity and not solidify or gel until such time as it is used in its end use application. PAE resins prepared according to the processes of the present invention have high molecular weight but avoid gelation during its preparation and subsequent storage.

The amount of epichlorohydrin used in the processes of the present invention can be calculated in two different ways. The first is as an epichlorohydrin to amine ratio. This value is the ratio of the number of moles of epichlorohydrin to the number of moles of amine functionality present in the polyamidoamine. This calculation requires one to know the amine equivalence weight of the polyamidoamine. One convention is to use the theoretical amine equivalence weight of the polymer. The theoretical amine equivalence weight is calculated by first taking the mass of starting materials used in the polyamidoamine synthesis and subtracting the mass of theoretical distillate. This value is then divided by the theoretical number of amine groups present in the polymer. For example: a DETA/DMG polyamidoamine made with a 1.2 DETA/DMG ratio the mass total mass of starting materials would be 123.89 g (1.2 moles DETA) plus 160.17 g (1.0 moles DMG) for a total of 283.97. Two moles of methanol are formed in the polycondensation for a theoretical distillate mass of 64.08 g. The total mass minus the theoretical distillate mass is 219.89 g. The theoretical number of amine groups present is equal to the total number of moles of DETA plus the number of moles of DETA present in excess. In this case the number of moles of amine excess will be (1.2 moles DETA)+(1.2 moles DETA −1.0 moles DMG) 1.4. Therefore the theoretical amine equivalence weight is 219.89 g/1.4 moles amine=157.06 g/mole.

The other way to calculate the epichlorohydrin charge is by taking the weight ratio of epichlorohydrin to polyamidoamine solids. The amount of epichlorohydrin is expressed as a weight percentage of the polyamidoamine solids used in the reaction.

The desired amount of epichlorohydrin used in the processes of the present invention was correlated to the ratio of the amine number of the polyamidoamine (solids basis) to the Reduced Specific Viscosity (RSV) after producing a number of creping adhesives from the amine-terminated polyamidoamines. It follows that the epichlorohydrin amount should be correlated to this ratio since the amine number gives a measure of the number of reactive amine groups present in the polymer and the RSV is related to the polymer molecular weight. Thus, a higher level of amine functionality requires more epichlorohydrin to react while a higher molecular weight polymer (as measured by RSV) will need a lower amount of epichlorohydrin to react and build the desired molecular weight in the PAE resin. The optimal epichlorohydrin amount will result in a reaction that builds the molecular weight of the PAE resin and provides a stable product. The processes of the present invention specify the maximum amount of epichlorohydrin that can be used to prepare stable products with acceptable molecular weights. Using a higher epichlorohydrin amount than the defined maximum amount can result in an extremely fast viscosity build in the resin synthesis, often resulting in gelation of the reaction mixture. The use of a higher epichlorohydrin level than the defined maximum amount can also result in poor stability of the resulting PAE resin under storage conditions. Use of an epichlorohydrin amount lower than the specified optimal maximum epichlorohydrin level may be used in the synthesis if a lower molecular weight product is desired.

Figure 1:
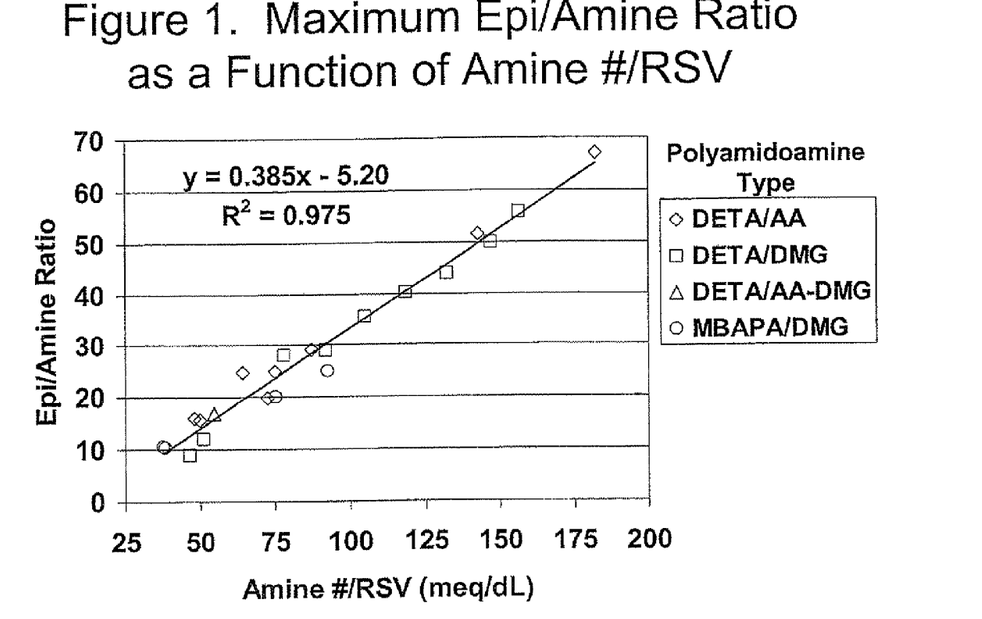
FIG. 1 illustrates a plot of the optimal epichlorohydrin to amine ratio as a function of the ratio of amine number to RSV for 22 μL resins made from varied amine-excess polyamidoamines.

FIG. 1 shows a plot of the optimal epichlorohydrin to amine ratio as a function of the ratio of amine number to RSV for 22 PAE resins made from varied amine-excess polyamidoamines. The results all fall on a straight line which has a correlation coefficient of 0.975. Thus this relationship can be used to define the proper epichlorohydrin to amine ratio.

The relationship used to calculate the maximum optimal epichlorohydrin to amine ratio (E/A) used to prepare PAE resins according to the processes of the present invention are expressed as being about:

$$E/A = 0.385(\text{Amine \#}/RSV) - 5.20 \qquad \text{Equation (3)}$$

where the epichlorohydrin/amine ratio is the mole ratio of epichlorohydrin to amine groups in the polyamidoamine. The number of amine groups present in the polyamidoamine is calculated from the theoretical amine equivalence weight of the polyamidoamine.

Figure 2:
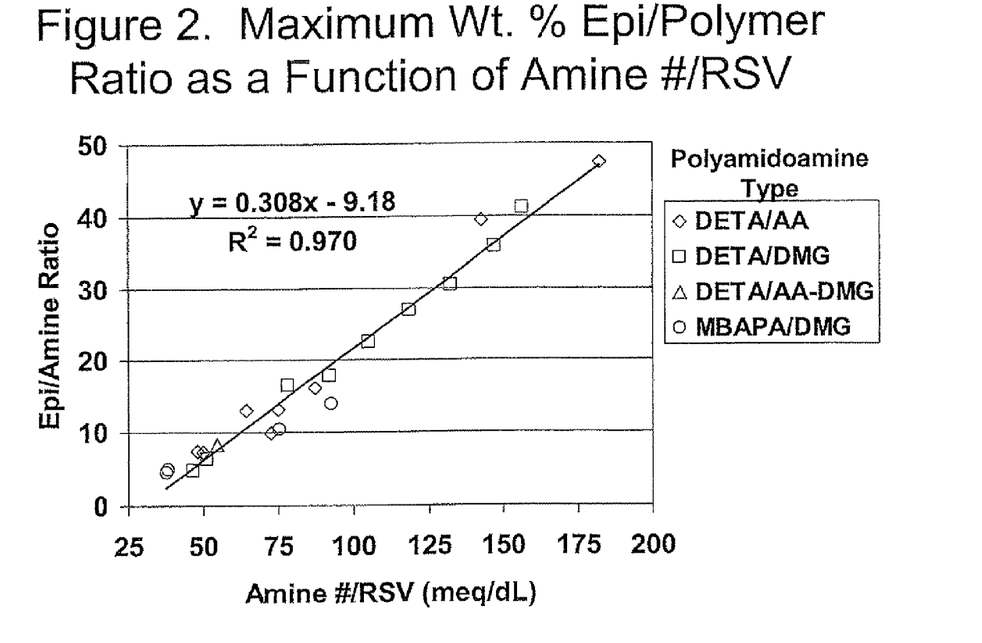
FIG. 2 illustrates a plot of the optimal epichlorohydrin to PAA solids level as a function of the ratio of amine number to RSV for 22 μL resins made from varied amine-excess polyamidoamines.

The epichlorohydrin charge can also be based on the ratio of epichlorohydrin to polyamidoamine (PAA) solids content. A plot of the optimal epichlorohydrin charge calculated in this manner as a function of the amine number to RSV ratio is plotted in FIG. 2. This plot also shows good agreement to a straight line. In this case the relationship for the optimal maximum epichlorohydrin charge used in the PAE synthesis is given as about:

$$\text{Wt.\% } Epi/PAA \text{ solids} = 0.308(\text{Amine \#}/RSV) - 9.18 \qquad \text{Equation (4)}$$

Either Equation 3 or Equation 4 may be used to calculate the epichlorohydrin amount used in the processes of the present invention. The two equations should give approximately equivalent results. When the PAE resin is not stabilized with acid, the preferred epichlorohydrin to amine ratio or epichlorohydrin to PAA solids ratio will be less than the quantity calculated using Equations 3 and 4 in order to assure stability of the product.

The desired epichlorohydrin amount preferably ranges from about the maximum amount defined in Equations 3 and 4 to about 60% of the quantity defined in Equations 3 and 4, more preferably from about the about the maximum amount defined in Equations 3 and 4 to about 70% of the quantity defined in Equations 3 and 4, and most preferably from about the maximum amount defined in Equations 3 and 4 to about 80% of the quantity defined in Equations 3 and 4.

Using an epichlorohydrin to amine ratio calculated based on the ratio of the polyamidoamine amine number to RSV allows one to produce a creping adhesive having high molecular weight and a minimal amount of reactive functionality. Determining the epichlorohydrin/amine ratio in this manner also provides benefits in commercial production of these products since the use of this relationship allows one to consistently produce a product with good performance by compensating for normal variations in the molecular weight and amine content of the starting polyamidoamine. It will also help to prevent the occurrence of gelled batches in the manufacturing process, which is a very costly and disruptive event for the manufacturer.

Another aspect of the present invention are PAE resins prepared according to the above described processes. Yet another aspect of the present invention are creping adhesives comprising PAE resins prepared according to the above described processes. PAE resins prepared according to the processes of the present invention can be used as creping adhesives in the papermaking process. The creping process is commonly practiced in the manufacture of tissue and towel grades of paper. This process involves scraping a dried paper web from a drying cylinder (Yankee dryer) by the use of a creping doctor blade. The creping action imparts a fine, rippled texture to the sheet and also increases the bulk of the sheet, resulting in improved softness and absorbency. An adhesive formulation is often used to control the adherence of the paper sheet to the Yankee dryer. The creping process typically involves applying creping adhesive, generally in the form of an aqueous solution or dispersion, to a drying surface for the web. Preferably, this surface is the surface of a rotating heated creping cylinder, such as the apparatus known as a Yankee dryer. The web is then adhered to the indicated surface. It is subsequently dislodged from the surface with a creping device—preferably, a doctor blade. The impact of the web against the creping device ruptures some of the fiber-to-fiber bonds within the web, causing the web to wrinkle or pucker. In this regard, fibrous webs, particularly paper webs, are conventionally subjected to the creping process in order to give them desirable textual characteristics, such as softness and bulk. It is well known that the use of such adhesive formulations can provide improved product quality and better control of the papermaking process.

Creping adhesives comprising PAE resins prepared according to the processes of the present invention may be in the form of solutions or dispersions and can further comprise one or more components, typically water-soluble polymers, such as additional polyamine epichlorohydrin resins, polyacrylamide, poly(vinyl alcohol), polyvinylamine, polyethyleneimine, polymethacrylamide, poly(acrylic acid), poly (methacrylic acid), poly(hydroxyethyl acrylate), poly (hydroxyethyl methacrylate), poly(n-vinyl pyrrolidinone), poly(ethylene oxide), hydroxyethyl cellulose, hydroxypropyl cellulose, guar gum, starch, agar, chitosan, alginic acid, carboxymethyl cellulose, highly branched polyamidoamines and silylated polyamidoamines. When combined with other water-soluble polymers in a creping adhesive formulation, the weight ratio of PAE resins prepared according to the processes of the present invention to the other water soluble polymers can be in the range of from 0.01 to 0.99 up to from 0.99 to 0.01.

Creping adhesive formulations comprising PAE resins prepared according to the processes of the present invention may also comprise one or more release agents, as well as other additives that may affect the creping process. This is known as the creping adhesive package. Suitable creping release agents are, for example, disclosed in U.S. Pat. Nos. 5,660,687; and 5,833,806, the disclosures of which are incorporated herein by reference in their entireties. In addition to adhesive components and release agent additives, creping adhesive formulations can further comprise surfactants, dispersants, salts to adjust the water hardness, acids or bases to adjust the pH of the creping adhesive composition, modifiers, or other useful additives. Suitable modifiers include, but are not limited to, the tackifier resins of U.S. Pat. No. 6,133,405, or the stabilizers of U.S. Pat. No. 6,280,571, the disclosures of which are incorporated herein by reference in their entireties.

The PAE resins prepared according to the processes of the present invention can be applied either by themselves or in combination with other components in the creping adhesive package to a means for creping a fibrous web, and employing this means to crepe the web. Further in this regard, the creping process of the invention can include the steps of applying the PAE resin either by itself or in combination with the creping adhesive package to a drying surface for the fibrous web, providing a fibrous web, pressing the fibrous web against the drying surface to adhere this web to the surface, and dislodging the fibrous web from the drying surface with a creping device to crepe the fibrous web.

Application of the creping adhesives of the present invention can be done in any manner known in the art and in forms comprising aqueous, solid, dispersion, or aerosol. One preferred mode of application is via a spray boom directed at the surface of the drying surface prior to transfer of the paper web. The creping adhesives can also be added at the wet end of the paper machine or can be applied to the wet web prior to its contact with the surface. Spray application of the creping adhesive can be done according to any of the conventional methods known in the art or any desired combination of application procedures.

Yet another aspect of the present invention are articles comprising polyamidoamine-epichlorohydrin resin prepared according to the above-described processes or the creping adhesive comprising polyamidoamine-epichlorohydrin resin prepared according to the above-described processes. Examples of such articles include, but are not limited to, facial tissue, bath tissue, wipes, paper towels, paper napkins, filter papers, and coffee filters.

The invention will now be described in further detail with reference to the following non-limiting examples.

EXAMPLES

Example 1

Polyamidoamine Made from Adipic Acid and Excess DETA

Apparatus: A one liter resin kettle fitted with mechanical anchor-type stirrer, thermocouple, heating mantle and distillation receiver. The reaction vessel was charged with 355.94 g DETA (99+%). While stirring, a quantity of 438.42 g adipic acid (99+%) was added over a period of 15 minutes. The temperature of the mixture increased to 117.4° C. during this addition. The reaction temperature was increased to 125° C. and was held there for 20 minutes. After the 20 minutes at 125° C. the reaction temperature was increased to 150° C. and was held there for 20 minutes. A the end of this 20 minute hold time the reaction set point was increased to 170° C. The temperature was maintained at 170° C. for 220 minutes while collecting distillate. A total of 99 mL distillate were obtained from the reaction (theoretical amount=108.12 mL). At the end of the 220 minute cook at 170° C. heating was discontinued and 680 g warm water (50-60° C.) were added to the reaction mixture. The product was cooled to ambient temperature and was transferred to a bottle. The product had a total solids content of 49.37%, a pH of 10.59 and a Brookfield viscosity of 195 cPs measured with a LVF model Brookfield viscometer using a #2 spindle at 60 rpm. The amine content of the polyamidoamine product was 6.725 meq/g on a dry product solids basis. The Reduced Specific Viscosity (RSV) of the product was 0.0929 dL/g as measured at 2.0% solids content in 1 M $NH_4Cl$. The amine number and RSV were determined as follows.

The method used for the determination of total amine content of polyamidoamines involves dissolving the product in a 1:1 ethylene glycol-isopropanol mixture and then potentiometrically titrating the resulting solution with 1 N hydrochloric acid (also in 1:1 EG-IPA) using a combination pH electrode.

Apparatus (1) Balance, capable of weighing to the nearest 0.0001 g.

(2) Automatic titrator, equipped with a 20 mL buret and stirrer—available from Brinkmann Instruments, Model Metrohm Titrino 794/798, or equivalent.

(3) Combination pH electrode—available from Brinkmann Instruments, Metrohm Part U.S. Pat. No. 6,0233,100. The electrode performance should be checked at least once per week with pH buffers.

(4) Stirrer, magnetic—available from VWR Scientific Co.

(5) Stirring bars, magnetic, 1½" length.

(6) Beakers, 150 mL.

(7) Bottles, for reagent storage.

(8) Flask, volumetric, 1 liter.

(9) Syringe, disposable, 10 mL, for sample weighing.

Reagents (1) Hydrochloric acid, concentrated, reagent grade, available from VWR Scientific, Cat. No. VW3110, or equivalent.

(2) Ethylene glycol, laboratory grade, available from VWR Scientific, Cat. No. JTL715, or Fisher Scientific, Cat. No. E178, or equivalent.

(3) Isopropyl alcohol (2-propanol), certified ACS grade, available from VWR Scientific, Cat. No. VW3250, or Fisher Scientific, Cat. No. A464-4 or A416, or equivalent.

(4) Ethylene glycol-isopropanol mixture, 1:1—Into a reagent storage bottle, combine 1 liter of ethylene glycol, Reagent 2, with 1 liter of isopropanol, Reagent 3, and mix thoroughly.

(5) Hydrochloric acid titrant, 1 N—Add approximately 400 mL of 1:1 ethylene glycol-isopropanol, Reagent 4, to a 1 liter volumetric flask. With a graduated cylinder, add 86 mL of concentrated hydrochloric acid, Reagent 1, and mix thoroughly. Allow the solution to cool to room temperature. Dilute to volume with 1:1 ethylene glycol-isopropanol, Reagent 4. Standardize this solution using of tris-(hydroxymethyl)aminomethane (THAM) as a primary standard. The THAM standard is dissolved in $CO_2$-free distilled or deionized water and titrated with the HCl solution to a potentiometric equivalence point or a methyl purple end point using ~1.7 grams of THAM. The normality of the HCl is then calculated.

(6) Bromophenol Blue indicator solution—See 050-16.

Sampling

Mix the sample well to be sure it is homogeneous. Even if the sample is hazy, it can be dispersed adequately to get a representative sample.

Procedure (1) Weigh, to the nearest 0.0001 g, two portions of sample (duplicates) into separate 150 mL beakers, sufficient to give approximately 12-15 mL titration, each. See Equation 5. Weighing by difference, from a disposable syringe, is recommended. Note: The sample should be ~25° C. before weighing.

(2) Add ethylene glycol-isopropanol mixture to cover the electrode (~80 mL).

(3) Place the beaker containing the sample on a magnetic stirrer, and stir for at least 10 minutes, or until the solution is clear. Heating should not be necessary. Only warm the sample if it is particularly difficult to dissolve.

(4) Insert the electrode in the solution and set up the titrator for mV titrations, according to the manufacturer's instructions. Alternately, add 0.1 to 0.2 mL of bromophenol blue indicator solution and mix well. (Potentiometric titration is preferred.)

(5) Titrate the sample solution with the standardized 1 N HCl solution, Reagent 5. Maintain good mixing, but avoid splashing the sample on the sides of the beaker. The indicator endpoint is a change from blue, through green, to yellow. Yellow is the endpoint.

(6) Determine the volume of titrant consumed at the equivalence point, which is the midpoint of the major inflection.

(7) Immediately remove the electrode from the titrated solution, and rinse the electrode with distilled or deionized water. Allow the electrode to remain wet between titrations; or immerse in the electrode storage solution until the next use.

(8) Calculate the amine concentration in the sample, as meq/g, using Equation 6. Convert to dry basis using Equation 7.

Calculations $$\frac{14}{Aw} = Wt \text{ Sample, g or } \frac{14 \times 100}{Ad \times TS} = Wt \text{ Sample, g} \quad \text{Equation (5)}$$

where:
14=desired titration volume, mL
Aw=expected wet basis Total Amine, meq/g
TS=sample wt % total solids
Ad=expected dry basis Total Amine, meq/g $$\frac{V2 \times N}{W2} = A \text{ meq/g total amines, wet basis} \quad \text{Equation (6)}$$

where:
V2=volume of titrant consumed by the sample, mL
N=normality of the titrant (Reagent 5)
W2 weight of sample, g $$\frac{A \times 100}{TS} = \text{meq/g total amine, dry basis} \quad \text{Equation (7)}$$

where:
A meq/g total amine from Equation 2
TS=sample % total solids

Determination of Reduced Specific Viscosity (RSV): The reduced viscosity of a 2% solution of the polymer in 1 N ammonium chloride is determined at 25.0° C. by means of a Cannon automated capillary viscometer. Flow times of the 2% polymer solution and the pure solvent are measured and the relative viscosity (Nrel) calculated. The reduced viscosity is calculated from the relative viscosity.

Apparatus (1) Cannon Polyvisc automated capillary viscometer, equipped with thermoelectric cooling available from Cannon Instrument Co., State College, Pa.

(2) Viscometer tube, No. 0.3-30, flush-cut, angle tip, with Viscometer Constant C=0.01-ibid., Cat. No. P65.2116.

(3) Computer, meeting specific instrument requirements, with printer.

(4) Instrument software with Reduced Viscosity reporting capability.

(5) Vials, Kimble Glass # 60958A-4—available from Fisher Scientific Co., Cat. No. 03-339-5A, VWR Scientific, Cat. No. 66014-301, or equivalent size plastic or glass vials.

(6) Caps with 1-hole, Kimble Glass # 73804-24400-ibid., Cat. No. 03-340-7K, 66010-887, or equivalent.

(7) Caps with no hole-ibid., Cat. No. 03-340-14A, 16198-915, or equivalent.

(8) Aluminum foil, thin, inexpensive (store-brand).

(9) Volumetric flask, 50 mL, Class A.

(10) Filter or stainless steel screen, ca. 100 mesh.

(11) Constant temperature bath, 25° C.

Reagents (1) Ammonium chloride, granular. ACS reagent grade.

(2) Solvent (1 N ammonium chloride). Add 53.5+/−0.1 g of $NH_4Cl$ to a 1-liter volumetric flask, dilute to volume with distilled water and mix.

(3) Cleaning solution, concentrated Chromerge ($H_{12}SO_4$–$K_2Cr_2O_7$) or No-Chromix (Chromium free). Do not dilute. Use only when water/IPA and acetone are not adequate.

(4) Acetone, reagent grade.

(5) Water, distilled or deionized.

(6) Isopropanol/Water, mix 50:50, for use as the wash solvent.

Instrument Setup (1) Turn on the instrument and computer system about 1 hour before measurements are to be made. Start the Instrument software. Note: Before measurements are made, the viscometer tube should be clean and dry. Initiate a wash cycle if necessary.

(2) From the upper menu bar, select Configure, Proviso, Instrument Settings, and verify that the instrument parameters are set properly.

Note: The air flow and Vacuum settings are automatically set, but can be adjusted if necessary.

Procedure

Sample Preparation (1) Determine the total solids content of the polymer sample.

(2) Calculate the amount of polymer required for 1.000+/−0.020 g of solids using Equation 8.

(3) Weigh, to the nearest 0.0001 g, the appropriate amount of sample, calculated in Step 2, into a 50 mL volumetric flask. Alternately, the sample can be weighed into a small beaker and quantitatively transferred to the 50 mL volumetric flask with 4 or 5 washings of ammonium chloride solution.

(4) Add 20-25 mL of 1 N ammonium chloride to the flask and gently swirl until the sample has completely dissolved. Then add ammonium chloride solution to within ¼" of the mark.

(5) Place the flask and contents in a 25° C. constant temperature bath and allow the temperature to equilibrate for at least 15 minutes.

(6) Slowly make up to the volume mark with more solvent and finally mix to obtain complete homogeneity. This will give a 2.000+/−0.040% solution. Calculate the actual concentration of the Polymer solution, to the nearest 0.0001 g/100 mL, using Equation 2.

(7) Filter the solution through a 100-mesh stainless steel screen, or comparable pore size filter, into a beaker, then transfer to a sample vial, to about ⅔ full. Cover the vial with thin aluminum foil, and cap the vial with a 1-hole cap.

Sample Analysis (1) Filter the ammonium chloride solvent through a 100-mesh filter into a beaker, then transfer to a sample vial, to about ⅔ fill. Cover it with aluminum foil, and cap the vial with a 1-hole cap.

(2) Log in to the software.

(3) Place the ammonium chloride solvent vial and sample vials in the autosampler tray. The ammonium chloride solvent must always be the first sample run. Note: The ammonium chloride flow time should be measured at least once per day when samples are run. This value is used in the RV Calculation.

(4) Enter the sample information in the computer:
  (a) Select the position of the first sample (solvent) on the top window (Instrument View Window).
  (b) Press the F5 function key or right click on select position.
  (c) Select "2 Determine Blank" (Solvent Viscosity).
  (d) Make sure that the density is set to 1.000 g/mL and click "OK."
  (e) Enter an ID name for the solvent blank, by pressing the F2 function key, or left click to select the position. Type the solvent ID name and press "Enter."
  (f) Select the position for the first sample solution, press the F2 function key or left click to select the position. Type the sample ID name and press "Enter."
  (g) A window will pop up labeled "Polymer Sample Measurement Options." The concentration is 2.0000 g/dL. Enter the actual sample concentration (Equation 9).
  (h) Make sure that the density is set to 1,0000 g/ml.
  (i) Select or enter the blank sample ID to be used for the RV calculation.
  (j) Click on "Ok."
  (k) Repeat steps (f) through (j) for the remaining samples.

(5) Click on the RUN button in the "Instrument View Window. The PolyVisc will start in the thermal equilibrating cycle (10 minutes).

(6) Select the lower analysis result window, select Main on upper left menu bar, and Print, to print the results.

Calculation $$\frac{100}{TS} = Ws \quad \text{Equation (8)}$$

where:
TS=% total solids of Polymer
Ws=weight of sample required for 1.000+/−0.020 g of solids $$\frac{Ws \times TS}{50} = Cp \quad \text{Equation (9)}$$

where:
Ws=actual weight of Polymer sample
TS=% total solids of Polymer
50=mL of diluted Polymer solution
Cp=concentration of Polymer solution, g/100 mL $$\frac{ts}{to} = Nrel \quad \text{Equation (10)}$$

where:
ts=average flow time of the 2% sample solution at 25° C., sec.
to=average flow time of the solvent at 25° C., sec.
Nrel=relative viscosity $$\frac{Nrel - 1}{Cp} = Nred \quad \text{Equation (11)}$$

where:
Nrel=relative viscosity
Cp=concentration of the polymer solution in grams of polymer solids per 100 mL of solution.
Nred=Reduced Specific Viscosity (RSV)

Report the reduced specific viscosity (RSV) to the nearest 0.0001 units.

Examples 2 to 11

Polyamidoamines Made from Adipic Acid and Excess DETA

Table 1A/1B lists the reaction conditions and properties of several polyamidoamines prepared with an excess of polyalkylenepolyamine. Examples 1 to 11 were prepared from an excess of diethylenetriamine (DETA) reacted with adipic acid. The polyamidoamines of Examples 2 to 11 were all prepared in a manner similar to that described in Example 1. The amine numbers and RSV values were obtained using the methods described in Example 1.

Table 1A/1B—Polyamidoamines Made with Excess DETA

TABLE 1A

| Example Number | Polyamidoamine Charge (1) | Theo DPn (2) | Cook Time/Temp | Theo. Amine Eq. Wt. |
|---|---|---|---|---|
| 1 | 1.15 DETA/AA | 14.3 | 3.67/170 | 174.36 |
| 2 | 1.10 DETA/AA | 21.0 | 3.67/170 | 186.11 |
| 3 | 1.20 DETA/AA | 11.0 | 3.67/170 | 166.67 |
| 4 | 1.05 DETA/AA | 41.0 | 3.67/170 | 196.97 |
| 5 | 1.15 DETA/AA | 14.3 | 3.67/170 | 174.36 |
| 6 | 1.05 DETA/AA | 41.0 | 3.67/170 | 196.97 |
| 7 | 1.67 DETA/AA | 4.0 | 3.67/170 | 119.66 |
| 8 | 1.50 DETA/AA | 5.0 | 3.67/170 | 131.67 |
| 9 | 1.33 DETA/AA | 7.0 | 3.67/170 | 152.08 |
| 10 | 1.05 DETA/AA | 41.0 | 3.671170 | 196.97 |
| 11 | 1.05 DETA/AA | 41.0 | 3.00/170 | 196.97 |
| 12 | 1.10 DETA/DMG | 21.0 | 3.00/175 | 174.65 |
| 13 | 1.15 DETA/DMG | 14.3 | 3.00/175 | 165.18 |
| 14 | 1.10 DETA/DMG | 21.0 | 3.00/175 | 174.65 |
| 15 | 1.20 DETA/DMG | 11.0 | 3.00/175 | 157.07 |
| 16 | 1.25 DETA/DMG | 9.0 | 3.00/175 | 150.04 |
| 17 | 1.30 DETA/DMG | 7.7 | 3.00/175 | 143.88 |
| 18 | 1.35 DETA/DMG | 6.7 | 3.00/170 | 138.45 |
| 19 | 1.40 DETA/DMG | 6.0 | 3.00/170 | 133.63 |
| 20 | 1.45 DETA/DMG | 5.4 | 3.00/170 | 129.31 |
| 21 | 1.50 DETA/DMG | 5.0 | 3.00/170 | 125.42 |
| 22 | 1.10 DETA/DMG | 21.0 | 3.00/170 | 174.65 |
| 23 | 1.10 DETA/DMG | 21.0 | 3.00/170 | 174.65 |
| 24 | 1.075 DETA/0.5 DMG + 0.5 AA | 27.7 | 3.00/170 | 186.07 |
| 25 | 1.2MBAPA/DMG | 11.0 | 3.00/175 | 193.14 |
| 26 | 1.3MBAPA/DMG | 7.7 | 3.00/175 | 178.07 |
| 27 | 1.1MBAPA/DMG | 21.0 | 3.00/175 | 213.22 |
| 28 | 1.4MBAPA/DMG | 6.0 | 3.00/175 | 166.36 |
| 29 | 1.25MBAPA/DMG | 9.0 | 3.00/170 | 185.10 |

TABLE 1A-continued

| Example Number | Polyamidoamine Charge (1) | Theo DPn (2) | Cook Time/ Temp | Theo. Amine Eq. Wt. |
|---|---|---|---|---|
| 30 | 1.1MBAPA/AA | 21.0 | 3.00/170 | 224.93 |
| 31 | 1.2DPTA/AA | 11.0 | 3.00/170 | 191.12 |
| 32 | 1.1DPTA/AA | 21.0 | 3.00/170 | 212.04 |

TABLE 1B

| Example Number | pH | Total Solids | B'field Visc. (cPs) | RSV dL/g | Amine # (meq/g) | Amine#/ RSV (meq/dL) |
|---|---|---|---|---|---|---|
| 1 | 10.59 | 49.37 | 195 | 0.0929 | 6.725 | 72.41 |
| 2 | 10.57 | 50.38 | 240 | 0.0982 | 6.312 | 64.28 |
| 3 | 10.88 | 48.35 | 160 | 0.0842 | 7.342 | 87.18 |
| 4 | 10.71 | 50.79 | 363 | 0.1047 | 5.749 | 54.91 |
| 5 | 10.85 | 49.67 | 170 | 0.0898 | 6.750 | 75.18 |
| 6 | 10.03 | 49.64 | 300 | 0.1162 | 5.800 | 49.91 |
| 7 | 11.25 | 42.14 | 65 | 0.0685 | 12.480 | 182.30 |
| 8 | 11.00 | 45.54 | 85 | 0.0741 | 10.580 | 142.78 |
| 9 | 10.68 | 46.80 | 100 | 0.0760 | 8.846 | 116.39 |
| 10 | 10.56 | 47.79 | 308 | 0.1205 | 5.775 | 47.93 |
| 11 | 10.31 | 49.68 | 468 | 0.1130 | 5.707 | 50.50 |
| 12 | 10.22 | 50.99 | 510 | 0.1333 | 6.207 | 46.56 |
| 13 | 11.17 | 49.76 | 245 | 0.1084 | 6.873 | 63.40 |
| 14 | 10.65 | 48.59 | 378 | 0.1275 | 6.514 | 51.09 |
| 15 | 10.77 | 50.01 | 180 | 0.0944 | 7.389 | 78.28 |
| 16 | 11.08 | 49.52 | 145 | 0.0848 | 7.805 | 92.07 |
| 17 | 10.51 | 49.11 | 109 | 0.0795 | 8.338 | 104.85 |
| 18 | 10.88 | 46.35 | 107 | 0.0817 | 9.672 | 118.38 |
| 19 | 10.91 | 45.90 | 93 | 0.0793 | #### | 132.21 |
| 20 | 9.42 | 45.20 | 77 | 0.0748 | #### | 147.07 |
| 21 | 11.16 | 44.90 | 73 | 0.0733 | #### | 156.67 |
| 22 | 10.68 | 49.50 | 295 | 0.1315 | 6.567 | 49.94 |
| 23 | 10.44 | 49.37 | 310 | 0.1321 | 6.390 | 48.37 |
| 24 | 10.39 | 48.35 | 285 | 0.1146 | 6.267 | 54.69 |
| 25 | 10.90 | 51.55 | 515 | 0.1306 | 5.005 | 38.32 |
| 26 | 11.22 | 49.48 | 211 | 0.0941 | 7.084 | 75.28 |
| 27 | 10.91 | 50.51 | 542 | 0.1402 | 5.276 | 37.63 |
| 28 | 11.84 | 48.38 | 150 | 0.0837 | 7.751 | 92.60 |
| 29 | 12.73 | 49.34 | 117 | 0.0721 | 5.786 | 80.22 |
| 30 | 10.26 | 50.28 | 342 | 0.1159 | 5.609 | 48.40 |
| 31 | 11.63 | 47.41 | 113 | 0.0845 | 5.948 | 70.37 |
| 32 | 11.28 | 48.14 | 144 | 0.0878 | 5.120 | 58.31 |

(1) DETA = Diethylenetriamine; AA = Adipic acid; DMG = Dimethyl glutarate; MBAPA = N-methyl-bis(aminopropyl)amine; DPTA = dipropylenetriamine
(2) Theoretical degree of polymerization calculated from stoichiometry of charge.

Example 12

Polyamidoamine Made from Dimethyl Glutarate and Excess DETA

Apparatus: A one liter resin kettle fitted with mechanical anchor-type stirrer, thermocouple, heating mantle and distillation receiver. The reaction vessel was charged with 340.46 g DETA (99+%). While stirring, a quantity of 480.51 g dimethyl glutarate (98%) was added through a pressure-equalizing addition funnel over a period of 5 minutes. The temperature of the mixture decreased from 21.6° C. to 16.8° C. during this addition. The apparatus was configured for reflux as the temperature was increased to 125° C. When the temperature reached 125° C. a strong reflux was observed. The reaction temperature was maintained below 125° C. for one hour while refluxing. At the end of the one hour the temperature of the refluxing mixture had dropped to 106.1° C. At this point the apparatus was reconfigured to take off methanol distillate. Distillate was collected while holding the reaction set point at 125° C. After 23 minutes 110 mL methanol distillate had been collected. At 33 minutes 130 mL methanol distillate had been collected and the rate of distillate production had slowed considerably. The temperature set point was then changed to 175° C. In 22 minutes the reaction temperature had reached 175° C. and a total of 155 mL methanol distillate had been collected. The reaction temperature was maintained at 175° C. for three hours while collecting distillate. At the end of the three hours at 175° C. a total of 160 mL distillate were collected. The theoretical volume of methanol distillate for this reaction was 152.1 mL. At this point heating of the reaction was discontinued and 620 g warm dilution water were added to the stirred product. The product had a total solids content of 50.99%, a pH of 10.22 and a Brookfield viscosity of 510 cPs measured with a LVF model Brookfield viscometer using a #2 spindle at 60 rpm. The amine content of the polyamidoamine product was 6.207 meq/g on a dry product solids basis, The Reduced Specific Viscosity (RSV) of the product was 0.1333 dL/g as measured at 2.0% solids content in 1 M $NH_4Cl$. The amine number and RSV were determined as described in Example 1.

Examples 13 to 23

Polyamidoamines Made from Dimethyl Glutarate (DMG) and Excess DETA

Reaction conditions and properties are shown in Table 1 for several polyamidoamines prepared from the reaction of dimethyl glutarate (DMG) with an excess of DETA. Examples 12 to 23 are polyamidoamines that were prepared in this manner. The polyamidoamines of Examples 13 to 23 were all prepared in a manner similar to that described in Example 12. The amine numbers and RSV values were obtained using the methods described in Example 1.

Example 14

Polyamidoamine Made from a Mixture of Adipic Acid and Dimethyl Glutarate (DMG) with Excess DETA Apparatus: A one liter resin kettle fitted with mechanical anchor-type stirrer, thermocouple, heating mantle and distillation receiver. The reaction vessel was charged with 332.72 g DETA (99+%). While stirring, a quantity of 240.26 g dimethyl glutarate (98%) was added through a pressure-equalizing addition funnel over a period of 3 minutes. The temperature of the mixture decreased from 21.4° C. to 17.8° C. during this addition. A quantity of 219.21 g adipic acid was then added to the stirred reaction mixture over a period of 15 minutes. The temperature of the reaction mixture increased from 17.8° C. to 35.6° C. during this addition. The apparatus was configured for reflux and the temperature was set for 125° C. When the temperature reached 125° C. a strong reflux was observed and the temperature quickly increased to 151.1° C. The heating mantle was removed and the temperature was allowed to drop to about 120° C. The reaction mixture was maintained under reflux conditions for one hour during which time the temperature stabilized at about 97° C. At the end of the one hour reflux period the apparatus was reconfigured to take off methanol distillate. Distillate was collected while holding the reaction set point at 125° C. After 19 minutes 80 mL distillate had been collected. The distillate from this reaction was a mixture of water and methanol due to the use of the mixture of adipic acid and dimethyl glutarate as starting materials. At 31 minutes 90 mL distillate had been collected and the rate of distillate production had slowed considerably. The temperature set point was then changed to 170° C. In 32 minutes the reaction temperature had reached 169.3° C. and a total of 127 mL distillate had been collected. The reaction temperature was then maintained at 170° C. for three hours while collecting distillate. At the end of the three hours at 170° C. a total of 155 mL distillate were collected. The theoretical volume of distillate for this reaction was 169.3 mL. At this point heating of the reaction was discontinued and 640 g warm dilution water were added to the stirred product. The product had a total solids content of 48.35%, a pH of 10.39 and a Brookfield viscosity of 285 cPs measured with a LVF model Brookfield viscometer using a #2 spindle at 60 rpm. The amine content of the polyamidoamine product was 6.267 meq/g on a dry product solids basis. The Reduced Specific Viscosity (RSV) of the product was 0.1146 dL/g as measured at 2.0% solids content in 1 M NH₄Cl. The amine number and RSV were determined as described in Example 1.

Examples 25 to 30

Polyamidoamines Made from Excess MBAPA with Adipic Acid or DMG

The entries for Examples 25 to 30 in Table 1 are for polyamidoamines made with an excess of N-methyl-bis-(aminopropyl)amine (M13APA). Examples 25 to 29 were made with dimethyl glutarate and were prepared in a manner similar to that described in Example 12. Example 30 was prepared with adipic acid and was synthesized as described in Example 1. The amine number and RSV for all of these examples were determined as described in Example 1.

Examples 31 and 32

Polyamidoamines Made from Excess DPTA with Adipic Acid

The entries for Examples 31 and 32 in Table 1 are for polyamidoamines made with an excess of dipropylenetriamine (DPTA) with adipic acid. These polyamidoamines were synthesized as described in Example 1. The amine number and RSV for both of these examples were determined as described in Example 1.

Example 33

PAE Resin Made from the Adipic Acid-DETA Excess Polyamidoamine of Example 10

Apparatus: A 3,000 mL round-bottomed 4-necked flask fitted with a condenser, thermocouple and heater, pH probe and an overhead mechanical stirrer. A quantity of 727.13 g polyamidoamine from Example 10 was charged to the flask with 492 g of dilution water. To the stirred reaction mixture was added 25.91 g epichlorohydrin. The reaction mixture was allowed to stir for 30 minutes at ambient temperature. The reaction temperature was then set for 50° C. The viscosity was monitored using BKY-Gardner bubble viscosity tubes when the temperature reached 50° C. After 142 minutes at 50° C. the BKY-Gardner viscosity had reached a value of M−. A quantity of 822 g dilution water was added to the reaction mixture at this point and the heating was maintained at 50° C. After an additional 75 minutes at 50° C. the viscosity had attained a BKY-Gardner viscosity value of M+. Heating was discontinued and 837 g cold dilution water along with 1.61 g potassium sorbate preservative were added to the reaction mixture. The pH was adjusted to 6.00 with 95.18 g concentrated phosphoric acid (85%) and was then adjusted to 3.99 with 34.91 g concentrated sulfuric acid (98%). The product had a total solids content of 17.30% and a Brookfield viscosity of 220 cPs measured with a LVF model Brookfield viscometer using a #2 spindle at 60 rpm. The Reduced Specific Viscosity (RSV) of the product was 0.9729 dL/g as measured at 2.0% solids content in 1 M NH₄Cl as described in Example 1.

Examples 34 to 80

PAE Resins Made from Amine Excess Polyamidoamines

Table 2A/2B shows the synthetic conditions and the properties of a number of PAE resins made from the polyamidoamines listed in Table 1. The PAE resins were prepared by reacting the polyamidoamines with epichlorohydrin in aqueous solution as described in Example 33. In some cases the temperature was increased in order to drive the reaction. Additional epichlorohydrin was sometimes added during the course of the reaction to achieve the desired viscosity build. The epichlorohydrin to amine values and the wt. % epichlorohydrin to polyamidoamine values listed take into account all epichlorohydrin added throughout the reaction. In some cases the pH of the product was adjusted to 3.0-4.0 with either concentrated sulfuric acid or concentrated phosphoric acid or a combination of the two. In other cases, the product was stored with no pH adjustment.

Table 2A/2B—PAE Resins Prepared from Amine-Excess Polyamidoamines

TABLE 2A

| Ex. # | PAA Ex. # | Wt. % Epi/ PAA | % Epi/ Amine | Cook Solids | Cook Temp. (° C.) | Cook Times (min.) | Final BKY-G Visc. |
|---|---|---|---|---|---|---|---|
| 33 | 10 | 7.46 | 16.00 | 30/20 | 50/50 | 142/75 | M−/M+ |
| 34A | 1 | 9.85 | 19.84 | 30/20 | 50-65/55-65 | 361/75 | M/D |
| 34B | 1 | 9.85 | 19.84 | 30/20 | 50-65/55-65 | 361/75 | M/D |
| 35A | 2 | 13.01 | 24.75 | 30/20 | 60/60-75 | 161/82 | M/D− |
| 35B | 2 | 13.01 | 24.75 | 30/20 | 60/60-75 | 161/82 | M/D− |
| 36A | 2 | 14.20 | 27.00 | 30/20 | 50-55/55 | 199/151 | M − N/M |
| 36B | 2 | 14.20 | 27.00 | 30/20 | 50-55/55 | 199/151 | M − N/M |
| 37 | 1 | 11.17 | 22.50 | 30/20 | 55/55 | 102/48 | M/M |
| 38 | 3 | 14.50 | 28.30 | 30 | 50-70 | 450 | M |
| 39 | 3 | 16.20 | 29.24 | 30 | 50-65 | 342 | M |
| 40 | 4 | 9.44 | 20.25 | 30/20 | 50/50 | 103/23 | M − N/M |
| 41A | 5 | 13.15 | 25.01 | 30/20 | 60/60 | 153/60 | N/M − N |
| 41B | 5 | 13.15 | 25.01 | 30/20 | 60/60 | 153/60 | N/M − N |
| 41C | 5 | 13.15 | 25.01 | 30/20 | 60/60 | 153/60 | N/M − N |
| 42A | 6 | 6.29 | 13.51 | 30 | 50-75 | 346 | −C |
| 42B | 6 | 6.29 | 13.51 | 30 | 50-75 | 346 | −C |
| 42C | 6 | 6.29 | 13.51 | 30 | 50-75 | 346 | −C |
| 43A | 6 | 7.34 | 15.76 | 30/20 | 50 | 120/105 | M − N/M |
| 43B | 6 | 7.34 | 15.76 | 30/20 | 50 | 120/105 | M − N/M |
| 43C | 6 | 7.34 | 15.76 | 30/20 | 50 | 120/105 | M − N/M |
| 44A | 7 | 44.54 | 62.44 | 30/20 | 50-60/60 | 471/60 | M/E − F |
| 44B | 7 | 44.54 | 62.44 | 30/20 | 50-60/60 | 471/60 | M/E − F |
| 44C | 7 | 44.54 | 62.44 | 30/20 | 50-60/60 | 471/60 | M/E − F |
| 45A | 7 | 47.35 | 67.00 | 35/20 | 60/60-75 | 258/173 | M+/M |
| 45B | 7 | 47.35 | 67.00 | 35/20 | 60/60-75 | 258/173 | M+/M |
| 45C | 7 | 47.35 | 67.00 | 35/20 | 60/60-75 | 258/173 | M+/M |
| 46A | 8 | 39.49 | 51.60 | 35/20 | 60/60-65 | 187/299 | M+/M |
| 46B | 8 | 39.49 | 51.60 | 35/20 | 60/60-65 | 187/299 | M+/M |
| 46C | 8 | 39.49 | 51.60 | 35/20 | 60/60-65 | 187/299 | M+/M |
| 47A | 12 | 4.76 | 8.99 | 30/20 | 50/50-75 | 220/189 | M/B − C |
| 47B | 12 | 4.76 | 8.99 | 30/20 | 50/50-75 | 220/189 | M/B − C |
| 47C | 12 | 4.76 | 8.99 | 30/20 | 50/50-75 | 220/189 | M/B − C |
| 48A | 12 | 6.62 | 12.50 | 30/20 | 50/50 | 105/55 | N/M − N |

TABLE 2A-continued

| Ex. # | PAA Ex. # | Wt. % Epi/ PAA | % Epi/ Amine | Cook Solids | Cook Temp. (° C.) | Cook Times (min.) | Final BKY-G Visc. |
|---|---|---|---|---|---|---|---|
| 48B | 12 | 6.62 | 12.50 | 30/20 | 50/50 | 105/55 | N/M – N |
| 48C | 12 | 6.62 | 12.50 | 30/20 | 50/50 | 105/55 | N/M – N |
| 49 | 14 | 6.36 | 12.00 | 30/20 | 80/105 | 80/105 | M–/M |
| 50 | 15 | 16.55 | 28.10 | 30/20 | 50/50 | 138/74 | M/Gel |
| 51A | 15 | 14.03 | 23.80 | 30/20 | 50/60 | 213/157 | M/M |
| 51B | 15 | 14.03 | 23.80 | 30/20 | 50/60 | 213/157 | M/M |
| 52A | 16 | 17.84 | 28.90 | 30/20 | 60/65 | 194/171 | M/J – K |
| 52B | 16 | 17.84 | 28.90 | 30/20 | 60/65 | 194/171 | M/J – K |
| 53A | 17 | 22.52 | 35.01 | 30/20 | 55-75/60 | 360/120 | M/E |
| 53B | 17 | 22.52 | 35.01 | 30/20 | 65/75 | 360/120 | M/E |
| 54 | 17 | 23.57 | 36.60 | 30/20 | 55/60 | 135/20 | M – N/M |
| 55A | 17 | 22.51 | 35.50 | 30/20 | 55/60 | 191/74 | N/M |
| 55B | 17 | 22.51 | 35.50 | 30/20 | 55/60 | 191/74 | N/M |
| 56A | 18 | 26.87 | 40.20 | 30/20 | 65/65 | 355/155 | M/F– |
| 56B | 18 | 26.87 | 40.20 | 30/20 | 65/65 | 355/155 | M/F– |
| 57 | 19 | 31.99 | 46.20 | 30/20 | 60/60 | 162/53 | M/S – T |
| 58 | 20 | 38.41 | 53.68 | 30/20 | 60/60 | 235/35 | M/R |
| 59A | 21 | 41.77 | 56.62 | 30/20 | 65/65 | 280/165 | M/N |
| 59B | 21 | 41.77 | 56.62 | 30/20 | 65/65 | 280/165 | M/N |
| 60A | 20 | 37.13 | 51.90 | 30/20 | 65/60 | 213/82 | M/M |
| 60B | 20 | 37.13 | 51.90 | 30/20 | 65/60 | 213/82 | M/M |
| 61A | 21 | 41.10 | 55.71 | 30/20 | 65/65 | 203/132 | M/M |
| 61B | 21 | 41.10 | 55.71 | 30/20 | 65/65 | 203/132 | M/M |
| 62A | 16 | 18.03 | 30.40 | 30/20 | 60/65 | 180/160 | M/M – N |
| 62B | 16 | 18.03 | 30.40 | 30/20 | 60/65 | 180/160 | M/M – N |
| 63A | 18 | 26.97 | 40.35 | 30/20 | 65/60 | 172/148 | M/M – N |
| 63B | 18 | 26.97 | 40.35 | 30/20 | 65/60 | 172/148 | M/M – N |
| 64A | 19 | 31.94 | 46.13 | 30/20 | 65/60 | 170/190 | M/N |
| 64B | 19 | 31.94 | 46.13 | 30/20 | 65/60 | 170/190 | M/N |
| 65A | 19 | 30.47 | 44.00 | 30/20 | 65/65 | 260/75 | M/D |
| 65B | 19 | 30.47 | 44.00 | 30/20 | 65/65 | 260/75 | M/D |
| 66A | 20 | 35.78 | 50.00 | 30/20 | 65/65 | 215/155 | M/M |
| 66B | 20 | 35.78 | 50.00 | 30/20 | 65/65 | 215/155 | M/M |
| 67A | 24 | 7.40 | 15.10 | 30/20 | 65/75 | 100/180 | M/E – F |
| 67B | 24 | 7.40 | 15.10 | 30/20 | 65/76 | 100/180 | M/E – F |
| 68A | 24 | 8.10 | 16.50 | 30/20 | 55/70 | 220/145 | M/E |
| 68B | 24 | 8.10 | 16.50 | 30/20 | 55/71 | 220/145 | M/E |
| 69A | 24 | 8.35 | 17.00 | 30/20 | 55/60 | 160/190 | M/M |
| 69B | 24 | 8.35 | 17.00 | 30/20 | 55/61 | 160/190 | M/M |
| 70A | 25 | 4.31 | 9.00 | 30/20 | 50/65 | 26/124 | M/C |
| 70B | 25 | 4.31 | 9.00 | 30/20 | 50/66 | 26/124 | M/C |
| 71A | 25 | 4.95 | 10.30 | 30/20 | 50/50 | 60/80 | M/M |
| 71B | 25 | 4.95 | 10.30 | 30/20 | 50/50 | 60/80 | M/M |
| 72A | 25 | 4.95 | 10.30 | 30/20 | 40/50 | 105/118 | M/M |
| 72B | 25 | 4.95 | 10.30 | 30/20 | 40/50 | 105/118 | M/M |
| 73A | 26 | 10.39 | 20.00 | 30/20 | 40/50 | 100/155 | M/B – C |
| 73B | 26 | 10.39 | 20.00 | 30/20 | 40/50 | 100/155 | M/B – C |
| 74 | 28 | 13.91 | 25.00 | 30/20 | 40/40 | 40/15 | S/T |
| 75A | 27 | 3.85 | 8.87 | 30/20 | 65/65 | 220/155 | M/B – C |
| 75B | 27 | 3.85 | 8.87 | 30/20 | 65/65 | 220/155 | M/B – C |
| 76A | 28 | 12.24 | 22.00 | 30/20 | 40/60 | 73/142 | M/D |
| 76B | 28 | 12.24 | 22.00 | 30/20 | 40/60 | 73/142 | M/D |
| 77A | 27 | 4.34 | 10.00 | 30/20 | 50/60 | 40/125 | M/D |
| 77B | 27 | 4.34 | 10.00 | 30/20 | 50/60 | 40/125 | M/D |
| 78A | 27 | 4.56 | 10.50 | 30/20 | 50/65 | 30/150 | L – M/E |
| 78B | 27 | 4.56 | 10.50 | 30/20 | 50/65 | 30/150 | L – M/E |
| 79A | 26 | 10.39 | 20.00 | 30/20 | 50/60 | 30/120 | M/D – E |
| 79B | 26 | 10.39 | 20.00 | 30/20 | 50/60 | 30/120 | M/D – E |
| 80A | 28 | 13.07 | 23.50 | 30/20 | 40/50 | 45/75 | M/M |
| 80B | 28 | 13.07 | 23.50 | 30/20 | 40/50 | 45/75 | M/M |

TABLE 2B

| Ex. # | PAA Ex. # | Added Acid | pH | Total Solids | Resin RSV (dL/g) | B'fld. Visc. (cPs) | Weeks Stable @ 90° F. | Weeks Stable @ 109° F. |
|---|---|---|---|---|---|---|---|---|
| 33 | 10 | Ph/Su | 3.99 | 17.30 | 0.9729 | 220 | >12 | >12 |
| 34A | 1 | Sulf. | 4.42 | 14.22 | 0.4111 | 30 | >12 | >12 |
| 34B | 1 | Phos. | 4.53 | 15.09 | 0.3655 | 33 | >12 | >12 |
| 35A | 2 | Sulf. | 4.51 | 15.14 | 0.4546 | 37 | >12 | >12 |
| 35B | 2 | Phos. | 4.54 | 16.43 | 0.3949 | 47 | >12 | >12 |
| 36A | 2 | Sulf. | 4.51 | 9.06 | — | 163 | >12 | >12 |
| 36B | 2 | Phos. | 4.49 | 16.01 | — | 150 | 1 | <1 |
| 37 | 1 | None | 8.87 | 12.30 | 0.8870 | 85 | <1 | <1 |
| 38 | 3 | Sulf. | 4.43 | 13.82 | 0.3523 | 25 | >12 | >12 |
| 39 | 3 | Sulf. | 4.44 | 13.56 | 0.3570 | 23 | >12 | >12 |
| 40 | 4 | None | 8.65 | 12.46 | 0.9168 | 83 | <1 | <1 |
| 41A | 5 | Sulf. | 4.39 | 15.65 | 1.0910 | 215 | >12 | >12 |
| 41B | 5 | Phos. | 4.47 | 17.23 | 0.8079 | 260 | >12 | >12 |
| 41C | 5 | None | 8.10 | 12.98 | 1.1070 | 163 | <1 | <1 |
| 42A | 6 | Sulf. | 3.52 | 13.68 | 0.2314 | 15 | >12 | >12 |
| 42B | 6 | Phos. | 3.58 | 15.38 | 0.1985 | 17 | >12 | >12 |
| 42C | 6 | None | 8.53 | 11.06 | 0.2419 | 13 | >12 | >12 |
| 43A | 6 | Sulf. | 3.46 | 15.00 | — | 125 | >12 | >12 |
| 43B | 6 | Phos. | 3.57 | 16.83 | — | 160 | >12 | >12 |
| 43C | 6 | None | 8.88 | 12.39 | — | 95 | <1 | <1 |
| 44A | 7 | Sulf. | 3.52 | 13.44 | 0.3900 | 25 | >12 | >12 |
| 44B | 7 | Phos. | 3.51 | 17.05 | 0.3358 | 35 | >12 | >12 |
| 44C | 7 | None | 7.58 | 15.58 | 0.3809 | 30 | <1 | <1 |
| 45A | 7 | Sulf. | 3.57 | 15.61 | 0.7013 | 105 | >12 | >12 |
| 45B | 7 | Phos. | 3.47 | 17.33 | 0.8641 | 155 | >12 | >12 |
| 45C | 7 | None | 7.33 | 13.82 | 0.8643 | 260 | <1 | <1 |
| 46A | 8 | Sulf. | 3.56 | 15.53 | 0.8643 | 147 | >12 | >12 |
| 46B | 8 | Phos. | 3.41 | 17.53 | 0.7127 | 180 | >12 | >12 |
| 46C | 8 | None | 7.40 | 13.71 | 0.8666 | 313 | <1 | <1 |
| 47A | 12 | Sulf. | 4.42 | 14.88 | 0.3197 | 20 | >12 | >12 |
| 47B | 12 | Phos. | 4.46 | 16.93 | 0.2778 | 25 | >12 | >12 |
| 47C | 12 | None | 8.76 | 11.91 | 0.3586 | 17 | >12 | >12 |
| 48A | 12 | Sulf. | 3.53 | 15.11 | 1.3300 | 275 | >12 | >12 |
| 48B | 12 | Phos. | 3.43 | 18.49 | 0.9496 | 197 | >12 | >12 |

TABLE 2B-continued

| Ex. # | PAA Ex. # | Added Acid | pH | Total Solids | Resin RSV (dL/g) | B'fld. Visc. (cPs) | Weeks Stable @ 90° F. | Weeks Stable @ 109° F. |
|---|---|---|---|---|---|---|---|---|
| 48C | 12 | None | 9.10 | 12.50 | — | 257 | <1 | <1 |
| 49 | 14 | Ph/Su | 3.85 | 19.31 | 0.9238 | 220 | >12 | >12 |
| 50 | 15 | Ph/Su | 2.60 | 17.00 | 0.7995 | 178 | >12 | >12 |
| 51A | 15 | None | 8.44 | 12.23 | 1.1170 | 398 | >12 | >12 |
| 51B | 15 | Ph/Su | 4.80 | 15.37 | 0.8173 | 210 | >12 | >12 |
| 52A | 16 | None | 8.41 | 11.99 | 0.9496 | 74 | >12 | >12 |
| 52B | 16 | Ph/Su | 4.66 | 14.94 | 0.8886 | 108 | >12 | >12 |
| 53A | 17 | None | 8.19 | 11.83 | 0.5145 | 36 | >12 | >12 |
| 53B | 17 | Ph/Su | 4.01 | 15.04 | 0.4657 | 24 | >12 | >12 |
| 54 | 17 | Ph/Su | 3.97 | 15.05 | 1.2350 | 600 | >12 | >12 |
| 55A | 17 | None | 7.64 | 11.53 | 1.2000 | 500 | >12 | >12 |
| 55B | 17 | Ph/Su | 3.93 | 14.56 | 1.0960 | 72 | >12 | >12 |
| 56A | 18 | None | 7.87 | 12.00 | 0.6924 | 41 | >12 | >12 |
| 56B | 18 | Ph/Su | 4.02 | 14.88 | 0.6289 | 55 | >12 | >12 |
| 57 | 19 | Ph/Su | 4.02 | 14.93 | 0.7445 | 779 | >12 | >12 |
| 58 | 20 | Ph/Su | 3.00 | 15.56 | 0.8978 | 199 | >12 | >12 |
| 59A | 21 | None | 7.43 | 11.95 | 0.8506 | 2,150 | 3 | >12 |
| 59B | 21 | Ph/Su | 3.73 | 15.18 | 0.9511 | 193 | >12 | >12 |
| 60A | 20 | None | 7.66 | 11.81 | 0.6943 | 1,248 | 2 | >12 |
| 60B | 20 | Ph/Su | 3.96 | 14.30 | 0.8883 | 116 | >12 | >12 |
| 61A | 21 | None | 7.45 | 12.21 | 0.9472 | 99 | >12 | >12 |
| 61B | 21 | Ph/Su | 3.72 | 14.72 | 0.8382 | 111 | >12 | >12 |
| 62A | 16 | None | 8.21 | 11.51 | — | 780 | >12 | >12 |
| 62B | 16 | Ph/Su | 3.98 | 14.42 | 0.9583 | 141 | >12 | >12 |
| 63A | 18 | None | 7.69 | 12.48 | 0.8119 | 81 | >12 | >12 |
| 63B | 18 | Ph/Su | 4.00 | 14.93 | 0.8286 | 102 | >12 | >12 |
| 64A | 19 | None | 7.47 | 12.72 | 0.9917 | 277 | 1 | <1 |
| 64B | 19 | Ph/Su | 4.00 | 15.17 | 0.7739 | 133 | >12 | >12 |
| 65A | 19 | None | 7.98 | 12.32 | 0.3768 | 17 | >12 | >12 |
| 65B | 19 | Ph/Su | 3.99 | 15.22 | 0.3426 | 23 | >12 | >12 |
| 66A | 20 | None | 7.83 | 12.4 | 0.8987 | 84 | >12 | >12 |
| 66B | 20 | Ph/Su | 3.95 | 15.23 | 0.7752 | 106 | >12 | >12 |
| 67A | 24 | None | 8.58 | 11.92 | 0.4317 | 18 | >12 | >12 |
| 67B | 24 | Ph/Su | 3.92 | 17.61 | 0.3046 | 28 | >12 | >12 |
| 68A | 24 | None | 8.57 | 11.72 | 0.4970 | 22 | >12 | >12 |
| 68B | 24 | Ph/Su | 3.78 | 15.29 | 0.3588 | 35 | >12 | >12 |
| 69A | 24 | None | 9.72 | 11.91 | 0.8501 | 47 | >12 | >12 |
| 69B | 24 | Ph/Su | 4.01 | 22.59 | 0.7995 | 70 | >12 | >12 |
| 70A | 25 | None | 10.06 | 13.52 | 0.4154 | 20 | >12 | >12 |
| 70B | 25 | Ph/Su | 3.96 | 19.09 | 0.2661 | 26 | >12 | >12 |
| 71A | 25 | None | 11.72 | 13.17 | 1.1130 | 50 | >12 | >12 |
| 71B | 25 | Ph/Su | 3.88 | 17.22 | 0.7470 | 107 | >12 | >12 |
| 72A | 25 | None | 10.39 | 13.02 | 1.0960 | 48 | >12 | >12 |
| 72B | 25 | Ph/Su | 3.98 | 25.41 | 0.0707 | 20 | >12 | >12 |
| 73A | 26 | None | 11.01 | 14.23 | 0.3969 | 19 | >12 | >12 |
| 73B | 26 | Ph/Su | 3.67 | 19.32 | 0.2791 | 27 | >12 | >12 |
| 74 | 28 | Ph/Su | 3.90 | 18.54 | 0.7504 | 364 | >12 | >12 |
| 75A | 27 | None | 10.90 | 13.82 | 0.3627 | 16 | >12 | >12 |
| 75B | 27 | Ph/Su | 2.20 | 17.58 | 0.2802 | 21 | >12 | >12 |
| 76A | 28 | None | 10.31 | 13.50 | 0.5231 | 25 | >12 | >12 |
| 76B | 28 | Ph/Su | 3.90 | 17.78 | 0.3926 | 35 | >12 | >12 |
| 77A | 27 | None | 11.16 | 13.38 | 0.5523 | 27 | >12 | >12 |
| 77B | 27 | Ph/Su | 3.98 | 16.92 | 0.4331 | 39 | >12 | >12 |
| 78A | 27 | None | 10.65 | 13.59 | 0.6028 | 31 | >12 | >12 |
| 78B | 27 | Ph/Su | 4.00 | 22.00 | 0.2267 | 33 | >12 | >12 |
| 79A | 26 | None | 11.70 | 13.98 | 0.5259 | 27 | >12 | >12 |
| 79B | 26 | Ph/Su | 3.85 | 22.08 | 0.3181 | 38 | >12 | >12 |
| 80A | 28 | None | 10.40 | 13.41 | 1.0870 | 261 | >12 | >12 |
| 80B | 28 | Ph/Su | 3.99 | 17.89 | 0.7476 | 147 | >12 | >12 |

(1) DETA = Diethylenetriamine; AA = Adipic acid; DMG = Dimethyl glutarate; MBPA = N-methyl-bis (aminopropyl)amine; DPTA = dipropylenetriamine Table 3A/3B lists the optimal formulations for several of the amine-terminated prepolymers and also shows the RSV, amine number and amine number/RSV ratios for these prepolymers.

Table 3A/3B—Optimal Formulations for PAE Resins Prepared from Amine-Excess Polyamidoamines

TABLE 3A

| Ex. # | PAA Ex. # | Wt. % Epi/PAA | % Epi/Amine | Final G-H Visc. | Added Acid | pH | Resin RSV (dL/g) |
|---|---|---|---|---|---|---|---|
| 33 | 10 | 7.46 | 16.00 | M−/M+ | Ph/Su | 3.99 | 0.9729 |
| 34A | 1 | 9.85 | 19.84 | M/D | Sulf. | 4.42 | 0.4111 |
| 35A | 2 | 13.01 | 24.75 | M/D− | Sulf. | 4.51 | 0.4546 |
| 39 | 3 | 16.20 | 29.24 | M | Sulf. | 4.44 | 0.3570 |
| 41A | 5 | 13.15 | 25.01 | N/M − N | Sulf. | 4.39 | 1.0910 |
| 43A | 6 | 7.34 | 15.76 | M − N/M | Sulf. | 3.46 | — |
| 45A | 7 | 47.35 | 67.00 | M+/M | Sulf. | 3.57 | 0.7013 |
| 46A | 8 | 39.49 | 51.60 | M+/M | Sulf. | 3.56 | 0.8643 |
| 47A | 12 | 4.76 | 8.99 | M/B − C | Sulf. | 4.42 | 0.3197 |
| 49 | 14 | 6.36 | 12.00 | M−/M | Ph/Su | 3.85 | 0.9238 |
| 50 | 15 | 16.55 | 28.10 | M/Gel | Ph/Su | 2.60 | 0.7995 |
| 52A | 16 | 17.84 | 28.90 | M/J − K | None | 8.41 | 0.9496 |
| 55B | 17 | 22.51 | 35.50 | N/M | Ph/Su | 3.93 | 1.0960 |
| 61A | 21 | 41.10 | 55.71 | M/M | None | 7.45 | 0.9472 |
| 63A | 18 | 26.97 | 40.35 | M/M − N | None | 7.69 | 0.8119 |
| 65A | 19 | 30.47 | 44.00 | M/D | None | 7.98 | 0.3768 |
| 66A | 20 | 35.78 | 50.00 | M/M | None | 7.83 | 0.8987 |
| 69A | 24 | 8.35 | 17.00 | M/M | None | 9.72 | 0.8501 |
| 72A | 25 | 4.95 | 10.30 | M/M | None | 10.39 | 1.0960 |
| 74 | 28 | 13.91 | 25.00 | S/T | Ph/Su | 3.90 | 0.7504 |
| 78A | 27 | 4.56 | 10.50 | L − M/E | None | 10.65 | 0.6028 |
| 79A | 26 | 10.39 | 20.00 | M/D − E | None | 11.70 | 0.5259 |

TABLE 3B

| Ex. # | PAA Ex. # | B'fld. Visc. (cPs) | Weeks Stable @ 90° F. | Weeks Stable @ 109° F. | PAA RSV dL/g | PAA Amine # (meq/g) | Amine#/RSV (meq/dL) |
|---|---|---|---|---|---|---|---|
| 33 | 10 | 220 | >12 | >12 | 0.1205 | 5.775 | 47.93 |
| 34A | 1 | 30 | >12 | >12 | 0.0929 | 6.725 | 72.41 |
| 35A | 2 | 37 | >12 | >12 | 0.0982 | 6.312 | 64.28 |
| 39 | 3 | 23 | >12 | >12 | 0.0842 | 7.342 | 87.18 |
| 41A | 5 | 215 | >12 | >12 | 0.0898 | 6.750 | 75.18 |
| 43A | 6 | 125 | >12 | >12 | 0.1162 | 5.800 | 49.91 |
| 45A | 7 | 105 | >12 | >12 | 0.0685 | 12.480 | 182.30 |
| 46A | 8 | 147 | >12 | >12 | 0.0741 | 10.580 | 142.78 |
| 47A | 12 | 20 | >12 | >12 | 0.1333 | 6.207 | 46.56 |
| 49 | 14 | 220 | >12 | >12 | 0.1275 | 6.514 | 51.09 |
| 50 | 15 | 178 | >12 | >12 | 0.0944 | 7.389 | 78.28 |
| 52A | 16 | 74 | >12 | >12 | 0.0848 | 7.805 | 92.07 |
| 55B | 17 | 72 | >12 | >12 | 0.0795 | 8.338 | 104.85 |
| 61A | 21 | 99 | >12 | >12 | 0.0733 | #### | 156.67 |
| 63A | 18 | 81 | >12 | >12 | 0.0817 | 9.672 | 118.38 |
| 65A | 19 | 17 | >12 | >12 | 0.0793 | #### | 132.21 |
| 66A | 20 | 84 | >12 | >12 | 0.0748 | #### | 147.07 |
| 69A | 24 | 47 | >12 | >12 | 0.1146 | 6.267 | 54.69 |
| 72A | 25 | 48 | >12 | >12 | 0.1306 | 5.005 | 38.32 |
| 74 | 28 | 364 | >12 | >12 | 0.0837 | 7.751 | 92.60 |
| 78A | 27 | 31 | >12 | >12 | 0.1402 | 5.276 | 37.63 |
| 79A | 26 | 27 | >12 | >12 | 0.0941 | 7.084 | 75.28 |

(1) DETA = Diethylenetriamine; AA = Adipic acid; DMG = Dimethyl glutarate; MBAPA = N-methyl-bis(aminopropyl)amine; DPTA = dipropylenetriamine FIG. 1 shows a plot of the optimal epi/amine ratio as a function of the amine number/RSV ratio. The relationship gives a straight line with a correlation coefficient of 0.975. The optimal epichlorohydrin to PAA solids level ratio as a function of the amine number to RSV ratio is plotted in FIG. 2. This plot shows a straight line with a correlation coefficient of 0.970. These two relationships can be used to quickly establish the appropriate epi/amine ratio to use in the synthesis of a PAE resin made from an amine-terminated polyamidoamine. This avoids the need for lengthy experimentation to establish the appropriate epi/amine ratio for a newly synthesized polyamidoamine.

Adhesion Testing

To provide a measure of the performance of the PAE resins of the invention, a device for evaluating the adhesive properties of potential creping adhesives was constructed. This device consisted of a heatable cast iron block that was mounted as a lower platen on the actuator of a MTS™ Test Star™ materials testing instrument, made by MTS Co., Minneapolis, Minn. The testing instrument has a stationary upper platen connected to the instrument's load cell. A paper sample was attached to the upper platen with double sided tape with a 0.057-0.058 inch Flex Cushion available from MacDermid Inc., Denver Colo., which is adhered between the paper sample and the load cell. The paper used in this procedure was a 40# basis weight sheet prepared from a 70/30 hardwood/softwood bleached Kraft furnish.

The lower platen was heated to 120° C., and sprayed with an aqueous solution of the adhesive being tested. A known quantity of the adhesive solution, having a known concentration of the adhesive, was employed. The known quantity of solution, with known concentration was provided by the use of an airbrush fitted with a volumetric spray bottle; the airbrush employed was Paasche V airbrush made by Paasche Airbrush Company, Harwood Heights, Ill. The volumetric spray bottle allowed accurate measurement of the volume of solution to be applied to the heated block. In these tests, a 1.2 mL solution having a 4.0% solids concentration was employed.

After the adhesive solution was sprayed onto the heated block, the actuator was raised to contact the heated block to the paper sample with a force of 10 kg. The actuator was then lowered, and the force necessary to pull the lower platen away from the paper was determined; this force was measured as the adhesion value of the adhesive being tested.

Because the applied force was not always exactly 10 kg, the adhesion value obtained was normalized to account for slight variations in the applied force. This normalization was accomplished by multiplying the measured adhesion value by [10/(Applied force in kg)].

Adhesion testing as described above was performed with several of the PAE creping adhesives. Results of this testing is shown in Table 4.

TABLE 4

Adhesion Testing of PAE Resins

| Sample | Test Temp. | pH | Adhesion (kg) |
|---|---|---|---|
| Crepetrol A3025 | 120° C. | 3.93 | 24.1 |
| 34A | 120° C. | 4.52 | 23.5 |
| 34B | 120° C. | 4.64 | 29.0 |
| 35A | 120° C. | 4.68 | 27.0 |
| 35B | 120° C. | 4.65 | 30.8 |
| 46A | 120° C. | 3.78 | 25.0 |
| 46B | 120° C. | 4.16 | 30.7 |
| 42A | 120° C. | 2.66 | 24.6 |
| 42B | 120° C. | 3.44 | 27.0 |
| 42C | 120° C. | 9.05 | 32.7 |
| 47A | 120° C. | 4.65 | 22.3 |
| 47B | 120° C. | 4.67 | 26.2 |
| 47C | 120° C. | 9.79 | 25.5 |
| 48A | 120° C. | 3.33 | 21.9 |
| 48B | 120° C. | 2.75 | 27.5 |
| 44A | 120° C. | 3.16 | 26.6 |

TABLE 4-continued

Adhesion Testing of PAE Resins

| Sample | Test Temp. | pH | Adhesion (kg) |
|---|---|---|---|
| 44B | 120° C. | 3.19 | 30.1 |
| 44C | 120° C. | 7.46 | 30.7 |

The PAE resins of the invention were compared to Crepetrol A3025, a commercial PAE creping adhesive sold by Hercules Incorporated, Wilmington Del. The adhesives of the invention gave adhesion values that were similar to or significantly greater than the adhesion value obtained for Crepetrol A3025.

Other adhesion testing experiments were performed at several temperatures to evaluate the adhesive's performance at elevated temperatures. These results are shown in Table 5.

TABLE 5

Adhesion Testing of Crepe Adhesive Samples at Different Temperatures

| Sample | Test Temp. | pH | Adhesion (kg) |
|---|---|---|---|
| Crepetrol 5318 | 120° C. | 4.59 | 28.1 |
| 47B | 120° C. | 4.67 | 26.2 |
| 48B | 120° C. | 3.75 | 27.5 |
| 42B | 120° C. | 3.44 | 27.0 |
| Crepetrol 5318 | 135° C. | 4.59 | 23.4 |
| 47B | 135° C. | 4.67 | 26.3 |
| 48B | 135° C. | 3.75 | 26.3 |
| 42B | 135° C. | 3.44 | 26.5 |
| Crepetrol 5318 | 150° C. | 4.59 | 21.4 |
| 47B | 150° C. | 4.67 | 25.3 |
| 48B | 150° C. | 3.75 | 25.9 |
| 42B | 150° C. | 3.44 | 25.3 |

Crepetrol 5318, a commercial PAE creping adhesive sold by Hercules Incorporated, Wilmington Del., was used as a comparison. Although Crepetrol 5318 shows higher adhesion than the adhesives of the invention at 120° C., the adhesion of Crepetrol 5318 drops as the test temperature is increased to 135° C. and to 150° C., while the adhesives of the invention show only a slight decrease in adhesion as the test temperature is increased. This indicates that these materials should have improved performance under conditions of high temperature.

What is claimed is:

1. A process for preparing a polyamidoamine-epichlorohydrin resin comprising the steps of:
   (1) reacting a polycarboxylic acid or a polycarboxylic acid derivative with an excess of a polyamine to form a polyamidoamine; and
   (2) reacting the polyamidoamine of (1) with epichlorohydrin to form a polyamidoamine-epichlorohydrin resin;
   wherein the molar ratio of said polyamine to said polycarboxylic acid is in the range of from 1.02:1 to 1.48:1; and
   wherein the weight percent of epichlorohydrin to polyamidoamine in step (2) is from 3.85% to 47%, and
   the maximum weight ratio of epichlorohydrin to the solids of polyamidoamine used in step (2) is no greater than about the calculated result of the mathematical expression [0.308-(amine number/RSV)—9.18], wherein said amine number is expressed as the milliequivalents of amine per gram of polyamidoamine solids and said RSV is the reduced specific viscosity measured at 2% concentration in 1 M $NH_4Cl$ expressed in deciliters per gram.

2. The process of claim 1, wherein the reaction between said polyamidoamine and said epichlorohydrin is conducted in an aqueous media.

3. The process of claim 1, wherein said polycarboxylic acid is selected from the group consisting of malonic acid, glutaric acid, adipic acid, azelaic acid, citric acid, tricarballylic acid (1,2,3-propanetricarboxylic acid), 1,2,3,4-butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, phthalic acid, isophthalic acid, terephthalic acid, 1,2,4-benzenetricarboxylic acid (trimellitic acid), 1,2,4,5-benzenetetracarboxylic acid (pyromellitic acid), and mixtures thereof.

4. The process of claim 1, wherein said polycarboxylic acid derivative is selected from the group consisting of dimethyl adipate, dimethyl malonate, diethyl malonate, dimethyl succinate, dimethyl glutarate, diethyl glutarate, succinic anhydride, maleic anhydride, N,N,N',N'-ethylenediaminetetraacetate dianhydride, phthalic anhydride, mellitic anhydride, pyromellitic anhydride, adipoyl chloride, glutaryl chloride, sebacoyl chloride, and mixtures thereof.

5. The process of claim 1, wherein said polyamine is selected from the group consisting of polyethylene polyamines, polypropylene polyamines, polybutylene polyamines, polypentylene polyamines, polyhexylene polyamines, and mixtures thereof.

6. The process of claim 1, wherein said polyamine is selected from the group consisting of diethylenetriamine (DETA), triethylenetetramine (TETA), tetraethylenepentamine (TEPA), dipropylenetriamine (DPTA), bis-hexamethylenetriamine (BHMT), N-methylbis(aminopropyl)amine (MBAPA), aminoethyl-piperazine (AEP), and mixtures thereof.

7. The process of claim 1, wherein the weight ratio of said epichlorohydrin to the solids of said polyamidoamine is about 60 to 100% of the calculated maximum weight ratio of epichlorohydrin to the solids of said polyamidoamine.

8. The process of claim 1, wherein said polycarboxylic acid derivative is adipic acid or dimethyl glutarate and said polyamine is diethylenetriamine (DETA).

9. A polyamidoamine-epichlorohydrin resin prepared by the process of claim 1.

10. A creping adhesive comprising the polyamidoamine-epichlorohydrin resin of claim 9.

11. An article comprising the creping adhesive of claim 10 wherein said article is selected from the group consisting of facial tissue, bath tissue, wipes, paper towels, paper napkins, filter papers, and coffee filters.

12. An article comprising the polyamidoamine-epichlorohydrin resin of claim 9 wherein said article is selected from the group consisting of facial tissue, bath tissue, wipes, paper towels, paper napkins, filter papers, and coffee filters.

* * * * *